(12) United States Patent
Okada et al.

(10) Patent No.: US 8,393,058 B2
(45) Date of Patent: Mar. 12, 2013

(54) CLIP

(75) Inventors: Shigeo Okada, Kanagawa (JP); Takeshi Nakajima, Kanagawa (JP)

(73) Assignee: Piolax Inc., Yokohama-shi, Kanagawa (JP)

( * ) Notice: Subject to any disclaimer, the term of this patent is extended or adjusted under 35 U.S.C. 154(b) by 583 days.

(21) Appl. No.: 12/362,148

(22) Filed: Jan. 29, 2009

(65) Prior Publication Data
US 2009/0188086 A1    Jul. 30, 2009

(30) Foreign Application Priority Data

Jan. 30, 2008  (JP) .................................. 2008-018820
Apr. 25, 2008  (JP) .................................. 2008-116397

(51) Int. Cl.
*F16B 21/08*  (2006.01)
(52) U.S. Cl. ........... 24/297; 24/458; 296/1.08; 411/510; 403/408.1
(58) Field of Classification Search .................... 24/297, 24/289, 453, 458; 296/1.08; 411/508, 509, 411/510; 403/408.1
See application file for complete search history.

(56) References Cited

U.S. PATENT DOCUMENTS

| 5,658,110 A * | 8/1997 | Kraus ............................. 411/510 |
| 6,572,317 B2 * | 6/2003 | Okada et al. ................... 411/508 |
| 6,974,292 B2 * | 12/2005 | Hansen .......................... 411/508 |
| 7,481,474 B2 * | 1/2009 | Higgins et al. ............... 296/1.08 |
| 7,967,539 B2 * | 6/2011 | Huet .............................. 411/508 |
| 2010/0322743 A1 * | 12/2010 | Ostergren ..................... 411/508 |

FOREIGN PATENT DOCUMENTS

| GB | 2006318 A * | 5/1979 |
| GB | 2026083 A * | 1/1980 |
| JP | 51-110226 U | 9/1976 |
| JP | 6-001817 U | 1/1994 |
| JP | 8-061334 A | 3/1996 |
| JP | 2571374 Y2 | 5/1998 |
| JP | 2002-174212 A | 6/2002 |
| WO | WO 2007099393 A1 * | 9/2007 |

OTHER PUBLICATIONS

Japanese Office Action dated Feb. 4, 2011, issued in corresponding Japanese Patent Application No. 2008-116397.

* cited by examiner

*Primary Examiner* — Robert J Sandy
*Assistant Examiner* — Michael Lee
(74) *Attorney, Agent, or Firm* — Westerman, Hattori, Daniels & Adrian, LLP

(57) ABSTRACT

According to an aspect of the present invention, there is provided a clip including: a flange and a leg. The leg includes: a pillar portion that vertically extends from the flange; a tip portion provided at a distal end in an axial direction; a rib that outwardly extends from the pillar portion to be connected to the flange and the tip portion; and an elastic engagement piece that extends from a distal end of the rib in a circumferential direction. The elastic engagement piece includes: a rigid portion that is connected to the rib and that is connected to the flange and the tip portion; and a deformable portion that is extended from the rigid portion and that is disconnected from the flange and the tip portion.

11 Claims, 18 Drawing Sheets

CLIP

CROSS-REFERENCE TO RELATED APPLICATIONS

This application claims priority from Japanese Patent Application No. 2008-018820 filed on Jan. 30, 2008, and from Japanese Patent Application No. 2008-116397 filed on Apr. 25, 2008, the entire contents of which are incorporated herein by reference.

BACKGROUND OF THE INVENTION

1. Field of the Invention

An aspect of the present invention relates to a clip which is inserted and fixed in a mounting hole formed in a part such as a body panel.

2. Description of the Related Art

Clips are used to attach a part such as a trim board to a part such as a body panel of a motor vehicle.

JP-UM-2571374-B discloses a clip having a support bar which includes a head portion and a leg portion, the leg portion being formed so as to be suspended from a central portion on a lower surface of the head portion, wherein at least three or more skeletal pieces are formed so as to project from the support bar along a radial direction and along a height direction of the support bar with a projecting width which allows the skeletal pieces to be inserted into a mounting hole with almost no space, wherein an elastic engagement piece which is permitted to be deformed inwards is formed at a tip portion of the skeletal pieces so as to extend along a circumferential direction of a circle which would be formed about the support bar as a center and have a radius equal to the projecting width of the skeletal piece, wherein a locking projection edge is formed on an outer circumferential surface of the elastic engagement piece in a position which is closer to its free end so as to project to be brought into engagement with a hole edge of the mounting hole, wherein a connecting portion with the skeletal piece is provided on the elastic engagement piece along a height direction of the skeletal piece, and wherein a lower edge of a portion of the elastic engagement piece which is made to extend in the circumferential direction is made to be a free end edge along a full length thereof.

The head portion is made up of a shaft piece and a plurality of flange-shaped pressing pieces which are provided on the shaft piece. A height-wise range where the elastic engagement piece is provided is made to range from a height position where the elastic engagement piece can be connected to a lower surface of the pressing piece in a lower stage to a position which lies slightly lower than a center of the skeletal piece. Namely, the elastic engagement piece has a construction in which its lower end portion is made to constitute a free end, while its upper end portion is connected to the pressing piece.

In the clip disclosed in JP-UM-2571374-B, however, since the elastic engagement piece which deforms when inserted into the mounting hole is connected to the lower stage pressing piece of the head portion at the upper end portion thereof, the elastic engagement piece is made difficult to deform at that portion, and when push inserting the clip completely into the mounting hole, a strong inserting effort is required in a final inserting stage, causing a problem with workability in mounting.

Although the elastic engagement piece is connected to the lower stage pressing piece at the upper end portion thereof, the elastic engagement piece is made free at the lower end portion thereof so that the elastic engagement piece is made easier to deform at the lower end portion. Therefore, for example, when a large external force is applied to the clip in a radial direction, the clip cannot be held by the elastic engagement pieces. As this occurs, the clip is to be held by at least the three skeletal pieces which project from the support bar. However, the clip cannot be held sufficiently only by these skeletal pieces, resulting in a case where the clip is forced to move from a given position.

SUMMARY OF THE INVENTION

According to an aspect of the present invention, there is provided a clip including: a flange that is to be brought into abutment with a member having an mounting hole from a front side; and a leg that is provided on one side of the flange to be inserted into the mounting hole, wherein the leg includes: a pillar portion that vertically extends from a center portion of the flange at the one side; a tip portion that is provided at a distal end in an axial direction of the pillar portion; a rib that outwardly extends from the pillar portion and that are connected to the flange and the tip portion at ends thereof in the axial direction; and an elastic engagement piece that extends from a distal end of the rib in a circumferential direction of the pillar portion and that is to be engaged with the mounting hole form a rear side, and wherein the elastic engagement piece includes: a rigid portion that is connected to the rib and that is connected to the flange and the tip portion; and a deformable portion that is extended from the rigid portion and that is disconnected from the flange and the tip portion.

The elastic engagement piece may have cuttings formed from a distal end thereof at ends in the axial direction. The deformable portion may be disconnected from the flange and the tip portion by the cuttings.

According to such configuration, when the leg part is pushed into the mounting hole, the elastic engagement pieces are brought into press contact with the inner circumference of the mounting hole and are inserted into the mounting hole while deforming inwards. When the elastic engagement pieces have passed the mounting hole, the elastic engagement pieces elastically restore their original positions so as to be brought into engagement with the mounting hole from the rear side, whereby the clip is fixed in the mounting hole.

The deformable portion which is connected to neither the flange part nor the tip portion is provided on the elastic engagement piece by the cuttings made therein, and since this deformable portion is easy to be deformed when the leg part is inserted into the mounting hole, the clip can be inserted and fixed in the mounting hole with a relatively small inserting effort. Since the elastic engagement piece extending from the rib in the circumferential direction is brought into engagement with the circumferential edge of the rear side of the mounting hole over a wide contact area which is made up of the deformable portion and the rigid portion, the clip can strongly be fixed in the mounting hole.

Even though an external force is applied to the clip in the radial direction or a direction in which the clip is pulled out with the clip fixed in the mounting hole, since there are provided the rib and the rigid portion of the elastic engagement piece which are connected to the flange part and the tip portion, respectively, so as to suppress the deformation of the elastic engagement piece by these portions, there occurs no such situation that the whole of elastic engagement piece deforms, thereby making it possible to retain the clip fast in the given position.

The deformable portion may have a swelling portion that outwardly protrudes more than an inner circumferential of the mounting hole.

According to such configuration, the swelling portion is provided on the deformable portion which is made easy to be deformed so as to swell more largely by the given height in the shifted-radial direction than the inside diameter of the mounting hole, and since this swelling portion is brought into engagement with the rear side of the mounting hole, a sufficient engaging margin for engagement with the mounting hole can be ensured with the inserting effort of the clip held small, thereby making it possible to fix fast the clip in place in the mounting hole.

The swelling portion may have a projection that is formed to be highest along the circumferential direction in the deformable portion and to be highest along the axial direction in the deformable portion.

According to such configuration, when the leg part is inserted into the mounting hole and the swelling portion passes through the mounting hole, the projection is brought into abutment with the inner circumference of the mounting hole, and the projection is pressed against the inner circumference of the mounting hole, whereby the leg part is passed through the mounting hole while the elastic engagement piece is being caused to deform. Since it is not that the outer circumference of the swelling portion is brought into abutment with the inner circumference of the mounting hole over a wide contact area but that the projection is brought into abutment with the inner circumference of the mounting hole at a relatively narrow area for passage therethrough, the leg part can be pushed into the mounting hole smoothly without an extra inserting effort.

When the leg part has passed through the mounting hole and the elastic engagement piece restores elastically its original position, the swelling portion and the projection are brought into engagement with the circumferential edge of the mounting hole from the rear side, whereby the engaging margin for engagement with the mounting hole is increased and the clip is fixed strongly to the mounting hole.

An inserting resistance produced when the leg part is inserted into the mounting hole continues to increase until the projection is inserted and passed through the mounting hole and decreases quickly once the projection has passed through the mounting hole. Since there is a steep rise and fall in inserting resistance, a clicking feeling can clearly be sensed when the projection has passed through the mounting hole and the fixing of the clip to the mounting hole can be ensured.

The swelling portion may include: an arc portion that extends in the circumferential direction from the distal end of the rib; and an inclined portion that extends in the circumferential direction from a distal end of arc portion. The projection may be placed in a boundary of the arc portion and the inclined portion. As viewed from the axial direction when the leg is inserted in the mounting hole so that the elastic engagement piece is inwardly deformed, the arc portion may follow the inner circumferential of the mounting hole, the inclined portion may be extend to gradually separate from the inner circumferential of the mounting hole, and the projection may abut the inner circumferential of the mounting hole.

According to such configuration, when the elastic engagement piece deforms inwards to pass through the mounting hole, since the projection is provided between the arc-shaped portion and the inclined portion, the click feeling can be obtained with the projection of lowest height, whereby the increase in deformable amount of the elastic engagement piece can be suppressed to a minimum limit, and the inserting effort of the leg part into the mounting hole can be suppressed to a low level.

The rigid portion may include a second swelling portion that is continuous with the swelling portion on the deformable portion and that protrudes more than the inner circumference of the mounting hole. A swelling amount of the second swelling portion may be smaller than that of the swelling portion.

According to such configuration, when mounting the clip, since the swelling portion on the rigid portion is strongly pressed against the edge of the panel, the rib is pressed in the circumferential direction, and the clip is biased in a direction in which it rotates. Therefore, even though a flash or the like remains on the inner circumference of the mounting hole, the clip is made difficult to be caught on the flash. In addition, since the largest swelling portion resides on the deformable portion, the low inserting effort can be maintained.

The rib may be extended so that an extending direction thereof does not pass through a center of the pillar portion.

According to such configuration, since the extending direction of the rib is determined to be the direction which does not pass through the axial center of the pillar portion, the extending angle of the elastic engagement piece which extends from the distal end of the rib relative to the rib can be ensured to a largest extent within a range where the inserting properties of the elastic engagement piece into the mounting hole are not reduced. As a result, a large space between the pillar portion and the elastic engagement piece can be ensured. Further, since a sufficient deformation space for the rigid portion can be ensured, when the leg part is inserted into the mounting hole, the elastic engagement piece can be made easier to deform.

BRIEF DESCRIPTION OF THE DRAWINGS

FIG. 20A is a graph showing a relationship between push-in distance and inserting resistance, and FIG. 20B is a graph showing a relationship between pull-out distance and holding force.

DETAILED DESCRIPTION OF THE EMBODIMENTS

Figure 1:
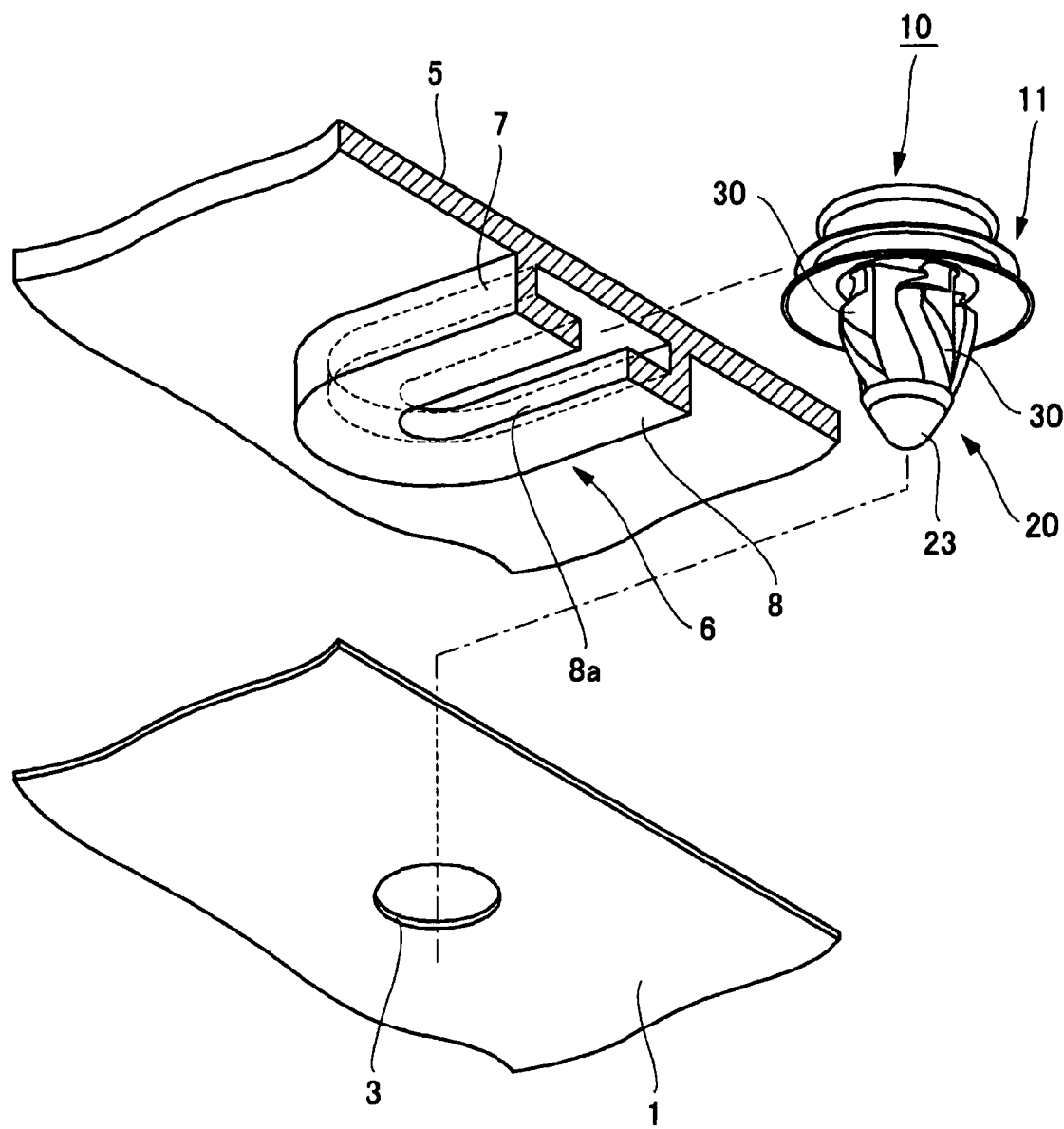
FIG. 1 is a perspective view showing a clip according to an embodiment of the invention.
Figure 8A:
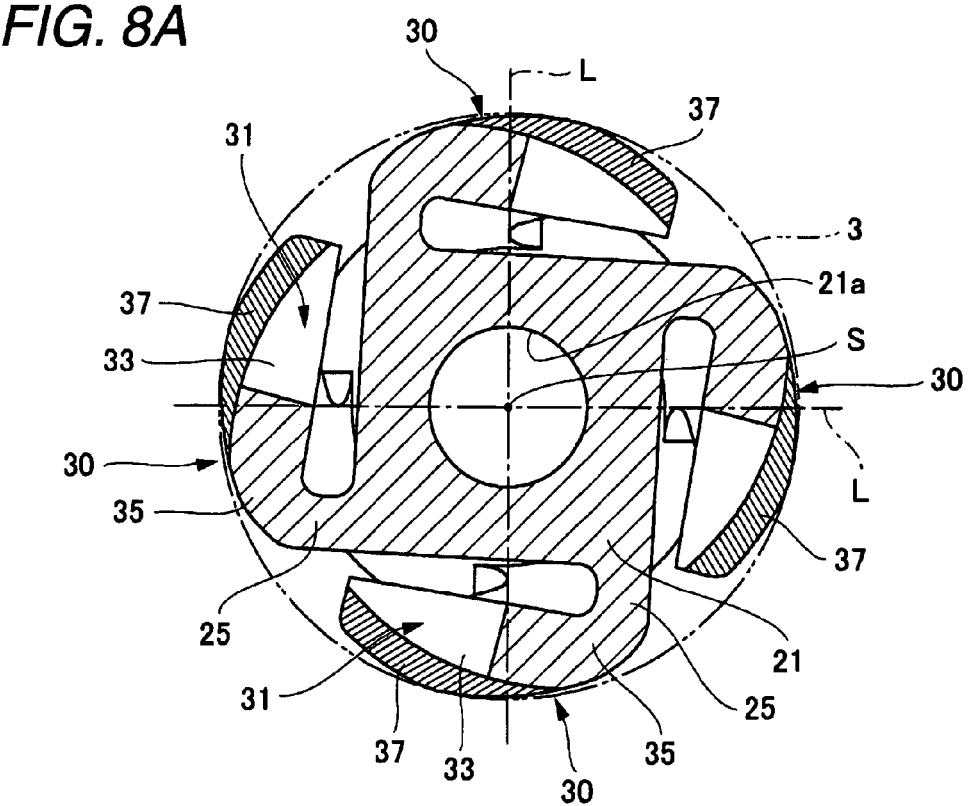
FIG. 8A is a plan view showing a state in which the elastic engagement pieces are being passed through a mounting hole.
Figure 8B:
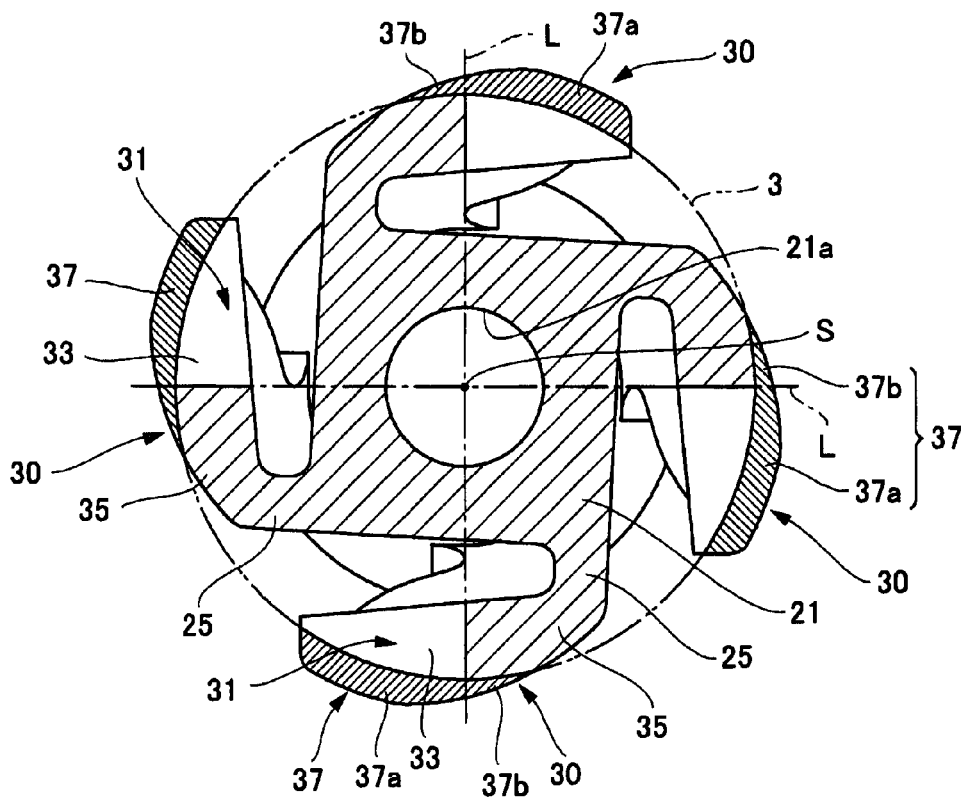
FIG. 8B is a plan view showing a state in which the elastic engagement pieces are fixed to a back side of the mounting hole.
Figure 9A:
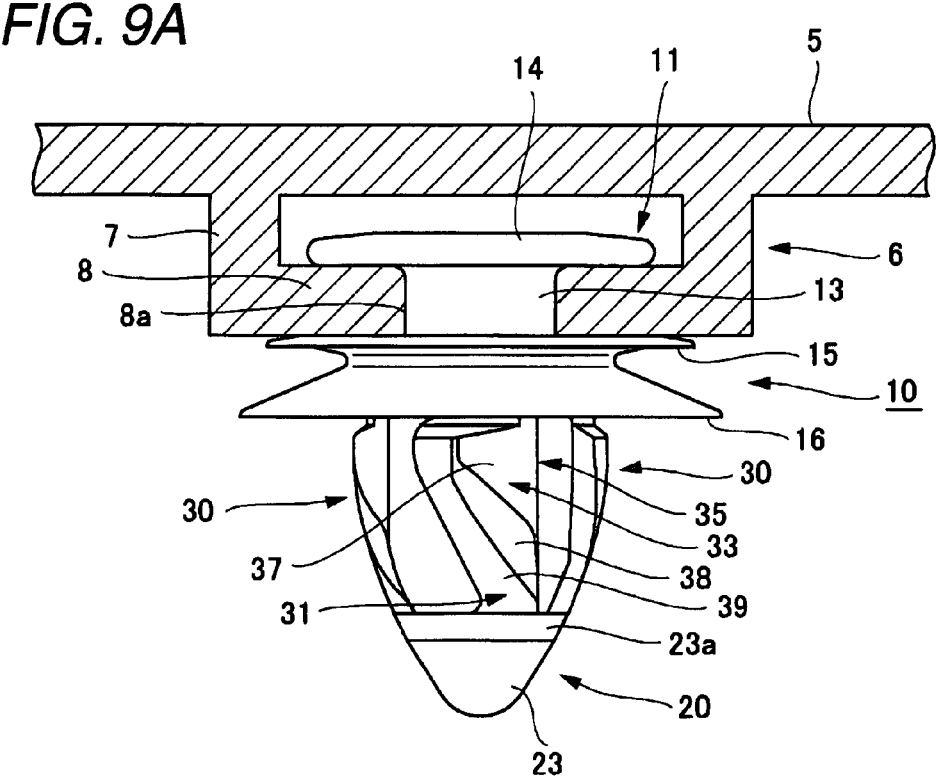
FIG. 9A is a plan view showing a state in which the clip is mounted on a part to be mounted on another part.
Figure 9B:
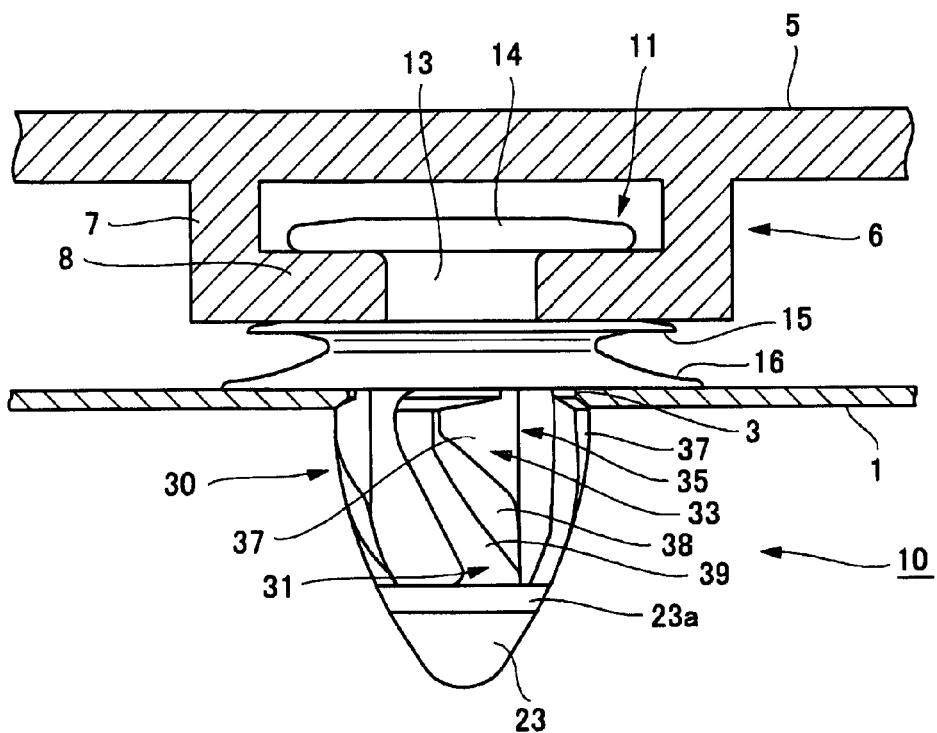
FIG. 9B is a plan view showing a state in which the part is mounted on another part using the clip.

A clip according to an embodiment of the invention will be described by reference to FIGS. 1 to 9B. As shown in FIGS. 1 and 9, a clip 10 is inserted and fixed in a mounting hole 3 of a body panel 1 to mount another part, such as a trim board 5, thereon through the clip 10, for example.

As shown in FIG. 1, a frame-like mounting seat 6 is provided on a back side of the trim board 5. A substantially U-shaped side wall 7 is provided on the mounting seat 6 so that a front side and a bottom side thereof are opened. A bottom wall 8 is connected to a bottom of the side wall 7. An inserting groove 8a is formed in the bottom wall 8.

The clip 10 has a head part 11 including a neck portion 13, a first flange portion 14, a second flange portion 15 and a third flange portion 16. The first to third flange portions 14 to 16 are formed, respectively, at an upper end portion, an intermediate portion and a lower end portion of the neck portion 13. The third flange portion 16 (flange portion) is formed so that circumferential edge thereof expands while being inclined obliquely downwards into an umbrella.

The clip 10 is attached to the trim board 5 by the neck portion 13 being inserted into the inserting groove 8a in the mounting seat 6 and the first flange portion 14 and the second flange portion 15 being made to hold the bottom wall 8 therebetween.

Figure 2:
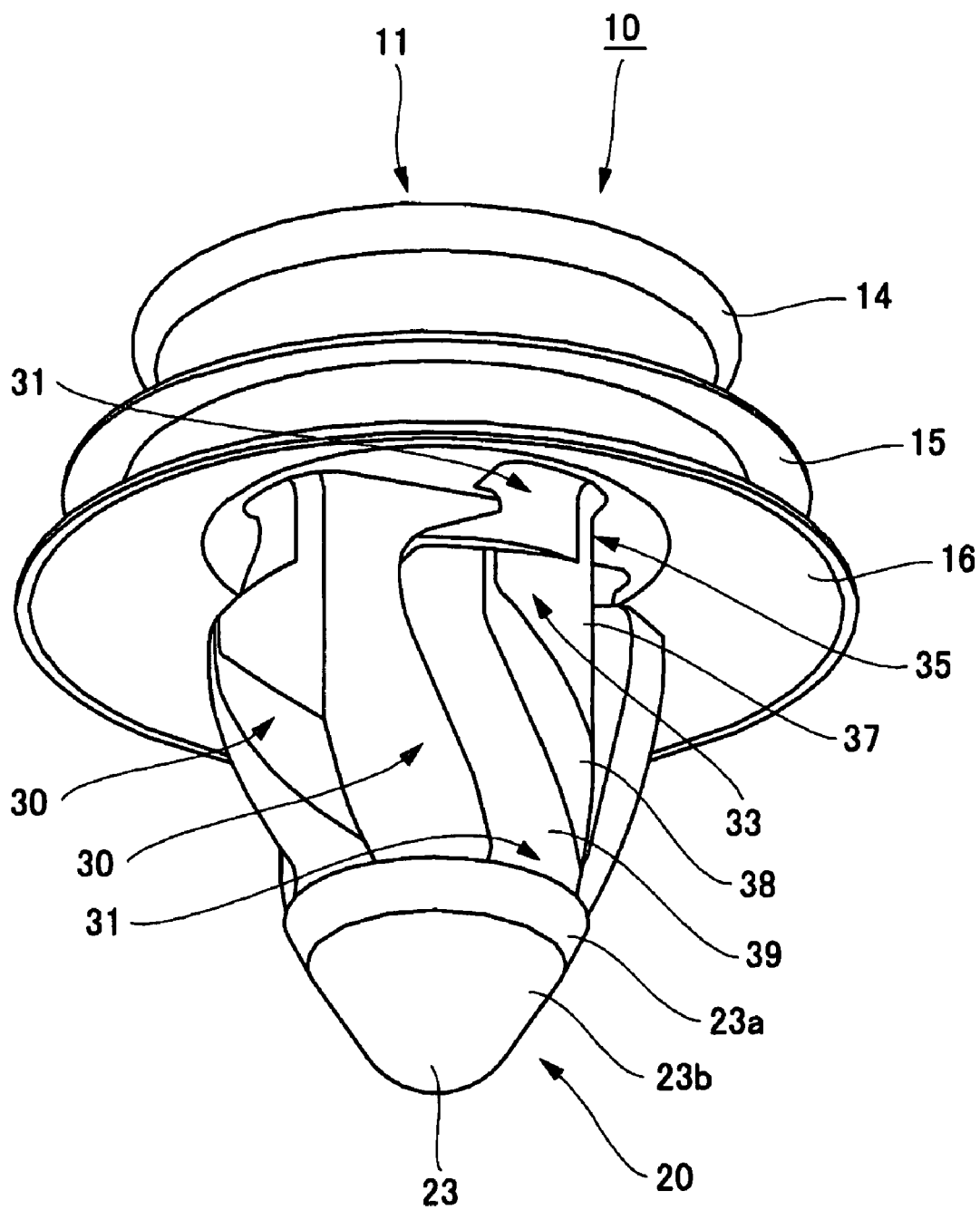
FIG. 2 is an enlarged perspective view of the clip.
Figure 4:
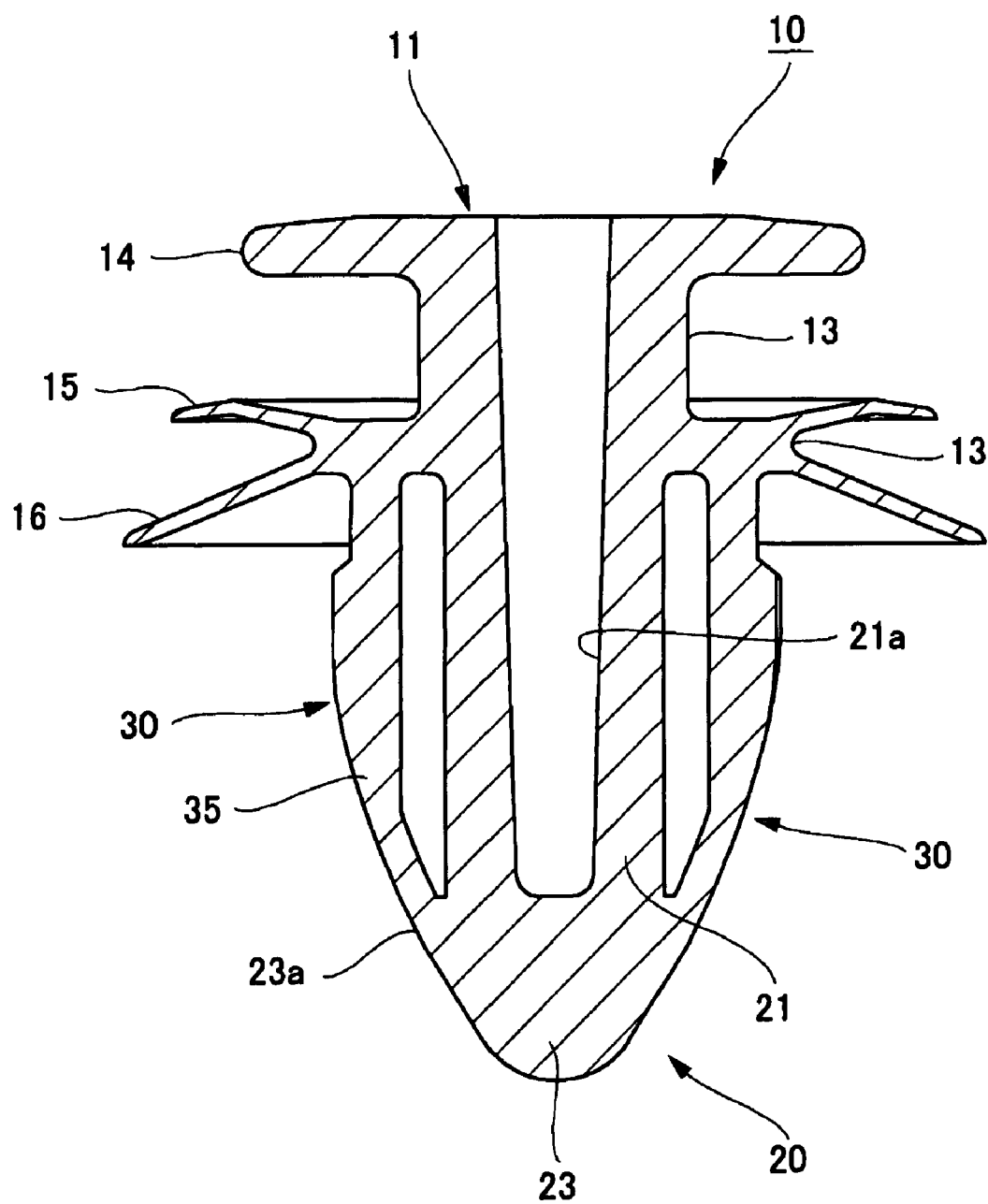
FIG. 4 is a sectional view of the clip taken along the line A-A in FIG. 3.
Figure 6:
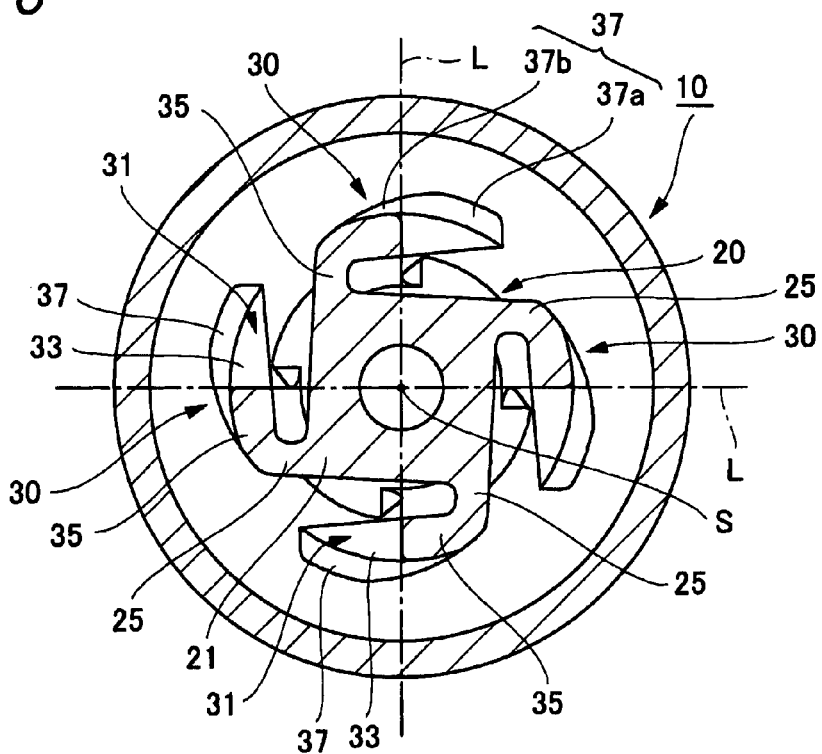
FIG. 6 is a sectional view of the clip taken along the line B-B in FIG. 3.
Figure 7:
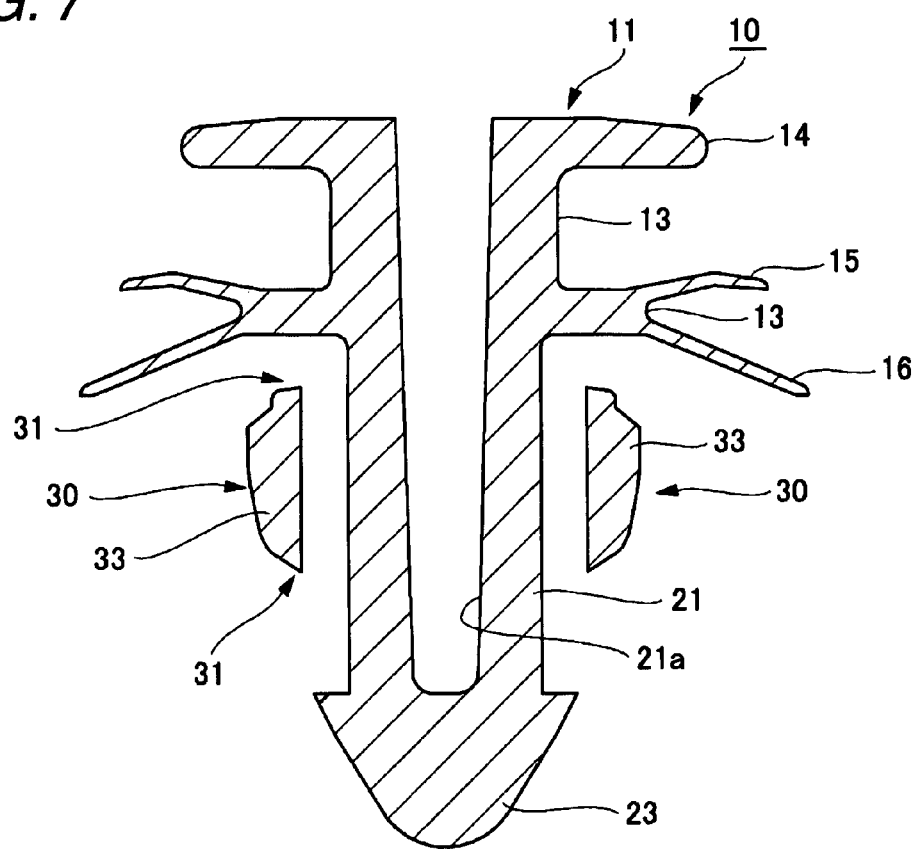
FIG. 7 is a sectional view of the clip taken along the line C-C in FIG. 5.

As shown in FIGS. 2, 4 and 7, a pillar portion 21 extends from a center of one side of the third flange portion 16. As shown in FIG. 6, this pillar portion 21 is formed into an angular shape (here, a quadrangular shape), and a hollow hole 21a is disposed in the center of the pillar portion 21 to penetrate through the neck portion (refer to FIG. 4). A conical-like tip portion 23 is provided at a distal end (a lower end) of the pillar portion 21. This tip portion 23 is formed into a circular cone shape having an apex portion being curved. The tip portion 23 has a proximal area 23a and a distal area 23a. At the distal area 23b, an outer circumference of the tip portion 23 is gradually reduced in diameter at a given angle as it extends in an inserting direction in which a leg part 20 is to be inserted into the mounting hole 3. At the proximal area 23a, the outer circumference is inclined at a slightly steeper angle than the outer circumference of the distal area 23b.

As shown in FIG. 6, ribs 25 extend over a given length in a shifted-radial direction from an outer circumference of the pillar portion 21. In this embodiment, each rib 25 dose not pass through an axial center S of the pillar portion 21 and extends from one end portion of each side surface of the quadrangular pillar portion 21, thus a total of four ribs 25 being disposed circumferentially at uniform intervals on the pillar portion 21. Each rib 25 is connected to the third flange portion 16 at an axial upper end (refer to FIG. 6) and is connected to the proximal area 23a of the tip portion 23 at an axial lower end thereof.

Figure 5:
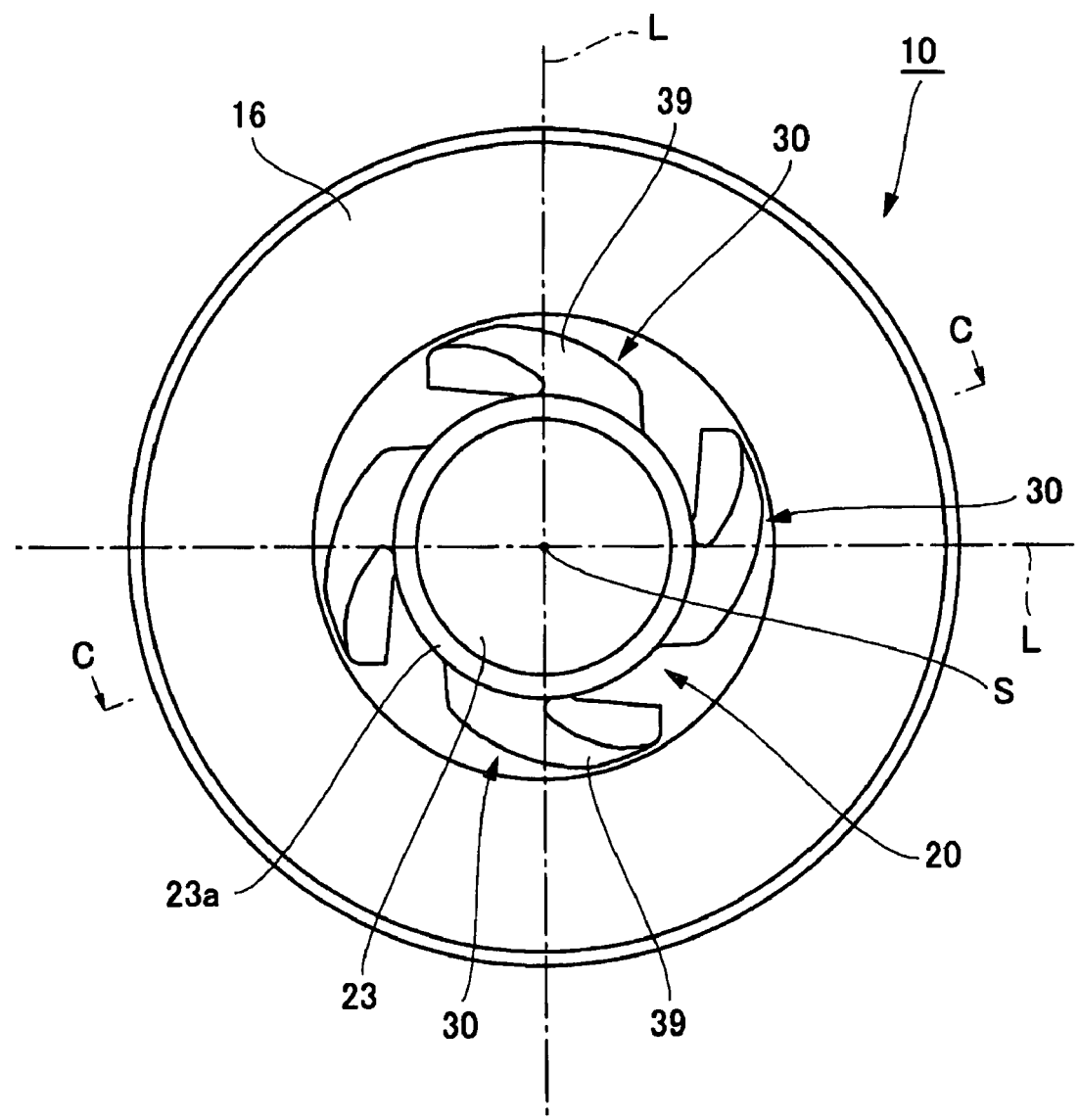
FIG. 5 is a bottom view of the clip according to the embodiment.

A plurality of elastic engagement pieces 30, which are made to be brought into engagement with the back side of the mounting hole 3, are provided at distal ends of the respective ribs 25 so as to extend along the circumferential direction. In this embodiment, four elastic engagement pieces 30 are made to extend, respectively, from the four ribs 25 which extend, in turn, from the respective sides surfaces of the quadrangular pillar portion 21. Thus, as shown in FIG. 5, when the pillar portion 21 is seen from a bottom side thereof, the elastic engagement pieces 30 are arranged so as to form a substantially swastika pattern.

Figure 3:
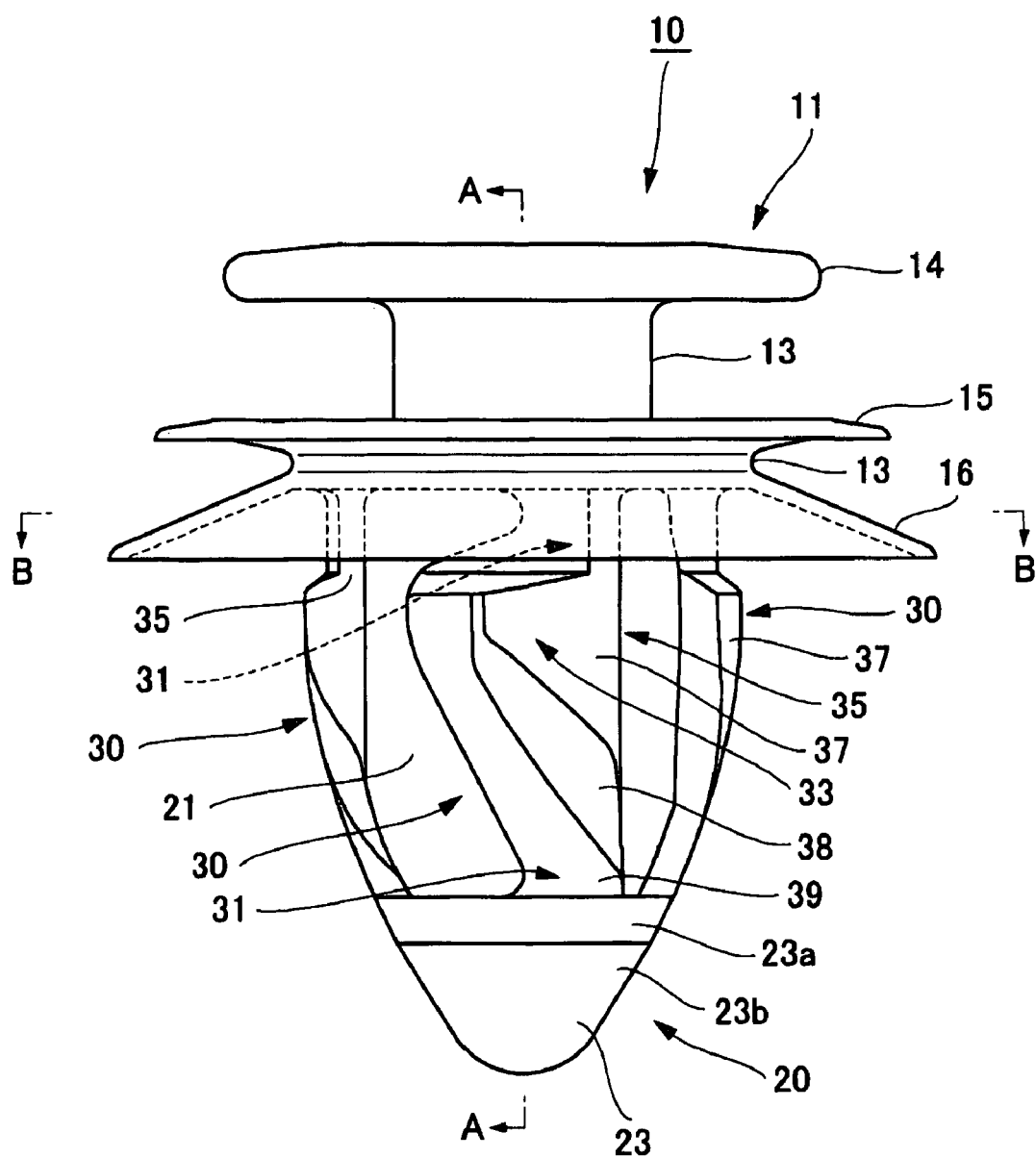
FIG. 3 is a front view of the clip.

As shown in FIGS. 2 and 3, cuts 31, 31 of a given length are provided in axial end portions of each elastic engagement piece 30 so as to extend along the circumferential direction from a distal end of the elastic engagement piece in an extending direction thereof. As shown in FIGS. 5, 6 and 8, in the embodiment, the cut 31 is formed over a length covering from the distal end of the elastic engagement piece 30 in its extending direction to a line L which passes through the axial center S of the pillar portion 21.

By providing the cuts 31, a deformable portion 33 which is connected to neither the third flange portion 16 nor the proximal area 23a of the tip portion 23 and a rigid portion 35 which is connected to the third flange portion 16 and the proximal area 23a of the tip portion 23 and which has a length shorter than the deformable portion 33 are provided on the elastic engagement piece 30. In FIG. 4, a section of the rigid portion 35 is shown, and the rigid portion 35 is connected to the third flange portion 16 and the proximal area 23a of the tip portion 23.

FIG. 7 shows a state in which a distal end of the deformable portion 33 in its extending direction is connected to neither the third flange portion 16 nor the tip portion 23. Since the deformable portion 33 is configured so as to be connected to neither the third flange portion 16 nor the tip portion 23 at its axial ends, when the leg part 20 is inserted into the mounting hole 3, the respective elastic engagement pieces 30 are pressed against the inner circumference of the mounting hole 3 to thereby be deformed inwards as shown in FIG. 8.

A swelling portion 37 is provided on at least the deformable portion 33 of the elastic engagement piece 30 so as to swell more largely than an inside diameter of the mounting hole and to a given height in a shifted-radial direction. As shown in FIGS. 2 and 8B, the swelling portion 37 of this embodiment is made up of a first swelling portion 37a which swells from an outer circumferential surface along a circumferential direction of the deformable portion 33 and a second swelling portion 37b which swells from an outer circumferential surface of the rigid portion 35 so as to continue to the first swelling portion 37a, and the swelling portion 37 made up of the first swelling portion 37a and the second swelling portion 37b is provided in a substantially axially intermediate position of the elastic engagement piece 30.

As shown in FIG. 8B, the swelling portion 37 has a shape in which the swelling portion 37 becomes lowest at a proximal end side of the second swelling portion 37b in the circumferential direction, starts from there to swell gradually higher, swells highest in an intermediate position along the circumferential length of the first swelling portion 37a and continues to swell to substantially the same height from there towards a circumferential distal end thereof. In addition, as shown in FIG. 2, an upper end portion of the swelling portion 37 is formed into a step shape which is gradually inclined obliquely downwards towards the shifted-radial direction, and this step-shaped upper end portion of the swelling portion 37 is brought into engagement with the circumferential edge of the back side of the mounting hole 3, whereby the clip 10 is fixed in the mounting hole 3.

As shown in FIG. 2, a first taper plane 38 is formed on the outer circumferential surface of the elastic engagement piece 30 and at a lower edge portion of the swelling portion 37 so as to be inclined obliquely downwards from the distal end side of the elastic engagement piece 30 in its extending direction towards a proximal end side thereof. In addition, a second taper plane 39 is formed on a lower half portion of the outer circumference of the elastic engagement piece 30, and an external shape of the second taper plane 39 is such as to follow the conical-like surface of the tip portion 23. In this embodiment, the second taper plane 39 is formed to extend along a lower edge portion of the first taper plane 38 towards the tip portion 23 to continue to the proximal area 23a of the tip portion 23 without any difference in level formed therebetween.

Next, how to use the clip 10 configured as has been described heretofore will be described.

Firstly, the head part 11 of the clip 10 is mounted on the mounting seat 6 formed in the trim board 5. As shown in FIG. 1, the neck portion 13 of the clip 10 is inserted into the inserting groove 8a of the mounting seat 6, and by the bottom wall 8 being held by the first flange portion 14 and the second flange portion 15, the clip 10 can be mounted on the trim board 5 via the mounting seat 6 as shown in FIG. 9A.

In this state, the tip portion 23 is inserted into the mounting hole 3 in the body panel 1. As this occurs, even though there is a minor error in alignment of the center of the tip portion 23 with the center of the mounting hole 3 and a flash generated through the punching process remains on the inner circumference of the mounting hole 3, since the tip portion 23 is formed into the conical-like shape, there occurs no such situation that the tip portion 23 is caught on the flash, and the tip portion 23 is guided for insertion into the mounting hole 3, whereby the leg part 20 can smoothly be inserted thereinto.

When the clip 10 is pushed into the mounting hole 3 from that state, the second taper planes 39 on the outer circumference of the elastic engagement pieces 30 are brought into abutment with the inner circumference of the mounting hole 3. As this occurs, since the second taper plane 39 is made into the taper plane whose external shape follows the conical-like surface of the tip portion 23, the clip 10 can be inserted into the mounting hole 3 smoothly.

When the clip 10 is pushed in further, the second taper planes 39 and the first taper planes 38 are brought into abutment with the inner circumference of the mounting hole 3 sequentially, whereby the respective elastic engagement pieces 30 are pressed against the inner circumference of the mounting hole 3. Since the deformable portions 33, which are connected to neither the third flange portion 16 nor the proximal area 23a of the tip portion 23, are provided on the elastic engagement pieces 30 as shown in FIG. 8A, the deformable portions 33 are gradually pushed into the mounting hole 3 while being pressed against the inner circumference of the mounting hole 3 to thereby deform inwards.

When the clip 10 is pushed in much further to allow the swelling portions 37 on the outer circumferential surfaces of the elastic engagement pieces 30 to pass through the back side of the mounting hole 3, the deformable portions 33 elastically restore their original positions, whereby the upper end portions of the swelling portions 37 are brought into engagement with the circumferential edge of the back side of the mounting hole 3 as shown in FIG. 8B, and the third flange portion 16 is brought into elastic abutment with a front side of the mounting hole 3 as shown in FIG. 9B. Thus, the clip 10 can be fixed in the mounting hole 3 without any looseness, and the trim board 5 can be attached to the body panel 1 via the clip 10.

As has been described above, in the clip 10, by providing the deformable portions 33 which are connected to neither the third flange portion 16 nor the tip portion 23 are provided on the elastic engagement pieces 30, when inserting the leg part 20 into the mounting hole 3, the deformable portions 33 are pressed against the inner circumference of the mounting hole 3, so as to be easily deformed. Therefore, the clip 10 can be inserted and fixed in the mounting hole 3 with a relatively small inserting effort. And, since the elastic engagement pieces 30 are provided in such manner as to extend from the corresponding ribs 25 in the circumferential direction, the elastic engagement pieces 30 are brought into engagement with the circumferential edge of the back side of the mounting hole 3 over the wide contact area, so that the clip 10 can strongly be fixed in the mounting hole 3 without increasing the inserting effort of the clip 10.

In this embodiment, the first swelling portion 37a is provided on the outer circumferential surface of the deformable portion 33 which is easy to be deformed, while the second swelling portion 37b is provided on the outer circumferential surface of the rigid portion 35 which is highly rigid, and the swelling portion 37 which is made up of the first swelling portion 37a and the second swelling portion 37b is brought into engagement with the circumferential edge of the back side of the mounting hole 3. Consequently, a sufficient engaging margin for engagement with the mounting hole 3 can be ensured while holding the inserting effort of the clip 10 low, thereby making it possible to fix fast the clip 10 in place in the mounting hole 3. In addition, when mounting the clip 10, by the second swelling portions 37b formed on the outer circumferential surfaces of the rigid portions 35 being pressed strongly against the edge of the panel, the respective ribs 25 are pressed in the circumferential direction, whereby the clip 10 is biased in the direction in which it rotates. Therefore, even though a flash remains on the inner circumference of the mounting hole 3, the clip 10 is made difficult to be caught on the flash.

As has been described above, although the deformable portion 33 is made to be deformed by being pressed against the inner circumference of the mounting hole 3, since the rib 25 which connects the deformable portion 33 to the pillar portion 21 is determined to extend in the direction which does not pass through the axial center S of the pillar portion 21 in this embodiment, the extending angle of the elastic engagement piece 30 which extends from the distal end of the rib 25 relative to the rib 25 can be ensured to a largest extent within a range where the inserting properties of the elastic engagement piece 30 are not reduced. As a result, a large space can be ensured between the pillar portion 21 and the elastic engagement piece 30. As a result, when the leg part 20 is inserted into the mounting hole 3, the elastic engagement piece 30 can be made easier to deform.

FIG. 9B shows a state in which the clip 10 is fixed in the mounting hole 3. Even though a large external force is applied to the clip 10 in a radial direction or in a direction in which the clip 10 is pulled out in that state, there occurs no such situation that the clip 10 is loosened or displaced. Namely, since the rigid portion 35 which is connected to the third flange portion 16 and the proximal area 23a of the tip portion 23 is provided on the elastic engagement piece 30 and a deformation as occurring in the deformable portion 33 is suppressed at this rigid portion 35, even though a large external force like the one described above is applied to the clip 10, the deformation of the whole of elastic engagement piece 30 is prevented, and as a result, the clip 10 can be held firmly in the given position.

Another embodiment of a clip according to the invention is shown in FIGS. 10 to 19. Note that like reference numerals will be imparted to like constituent parts to those described in the embodiment above, and the description thereof will be omitted herein.

When comparing FIGS. 1 to 3 which illustrates the embodiment that has been described above and FIGS. 10 to 12 which illustrate this embodiment, a clip 10a of this embodiment differs from the clip 10 of the previous embodiment in that a projection 40 is formed on an outer circumferential surface of a swelling portion 37 so as not only to project highest along a circumferential direction of a deformable portion 33 but also to project highest along an axial direction of the deformable portion 33.

Figure 17A:
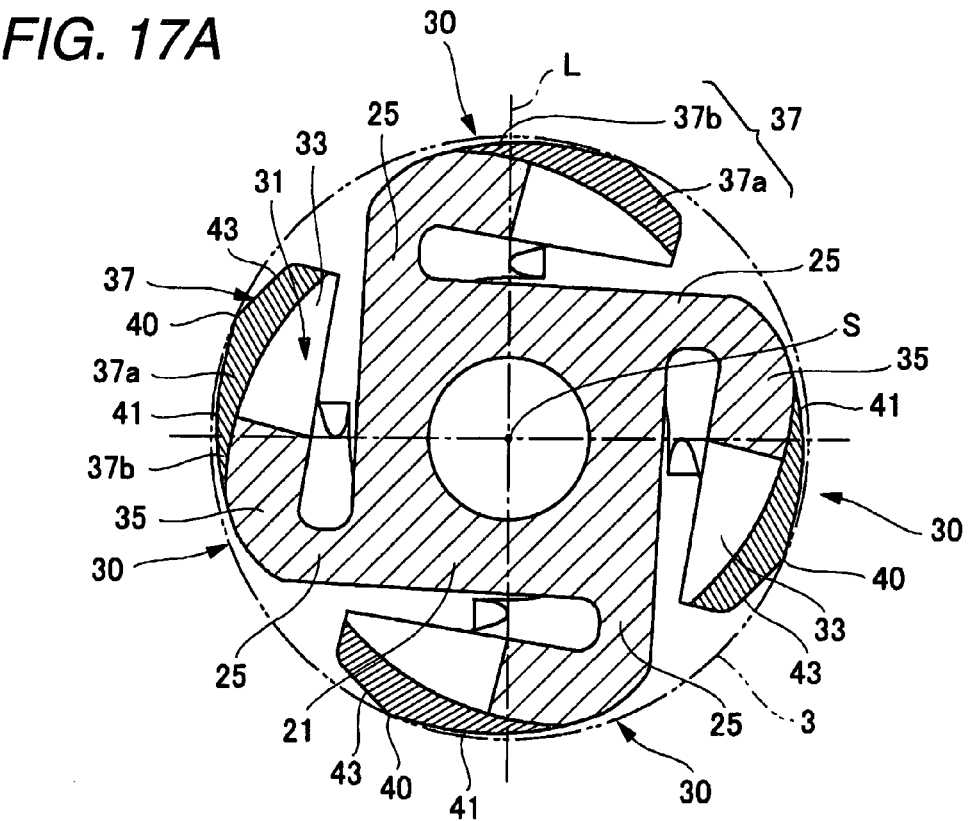
FIG. 17A is an explanatory sectional view resulting when a state is viewed from an axial direction in which the elastic engagement pieces are being passed through the mounting hole.
Figure 17B:
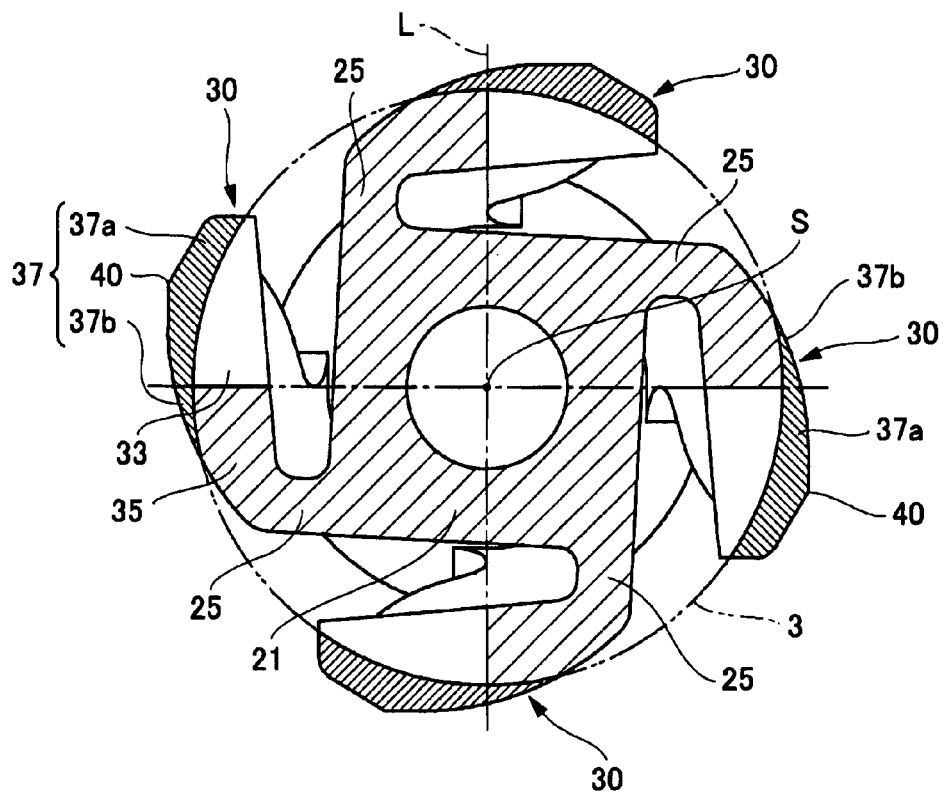
FIG. 17B is an explanatory sectional view resulting when a state is viewed from the axial direction in which the elastic engagement pieces are fixed to the back side of the mounting hole.

The different point will specifically be described below. FIGS. 17A and 17B show a state in which elastic engagement pieces 30 of the clip 10a are deformed. FIG. 17A is an explanatory sectional view as viewed from an axial direction in which the elastic engagement pieces 30 are being passed through the mounting hole 3, and FIG. 17B is an explanatory sectional view as viewed from the axial direction in which the elastic engagement pieces 30 are fixed to a back side of the mounting hole 3.

As shown in FIG. 17A, when the elastic engagement piece 30 is deforming inwards to pass through the mounting hole 3 is viewed in the axial direction, the swelling portion 37 is seen as having an arc-shaped portion 41 which extends from a distal end of a rib 25 in a circumferential direction along an inner circumference of the mounting hole 3 and an inclined portion 43 which extends from a circumferential distal end of the arc-shaped portion 41 towards a distal end of the elastic engagement piece 30 so as to be gradually spaced apart from the inner circumference of the mounting hole 3. The projection 40 lies at a boundary portion between the arc-shaped portion 41 and the inclined portion 43 and constitutes a portion which is brought into an abutment with the inner circumference of the mounting hole 3.

Figure 12:
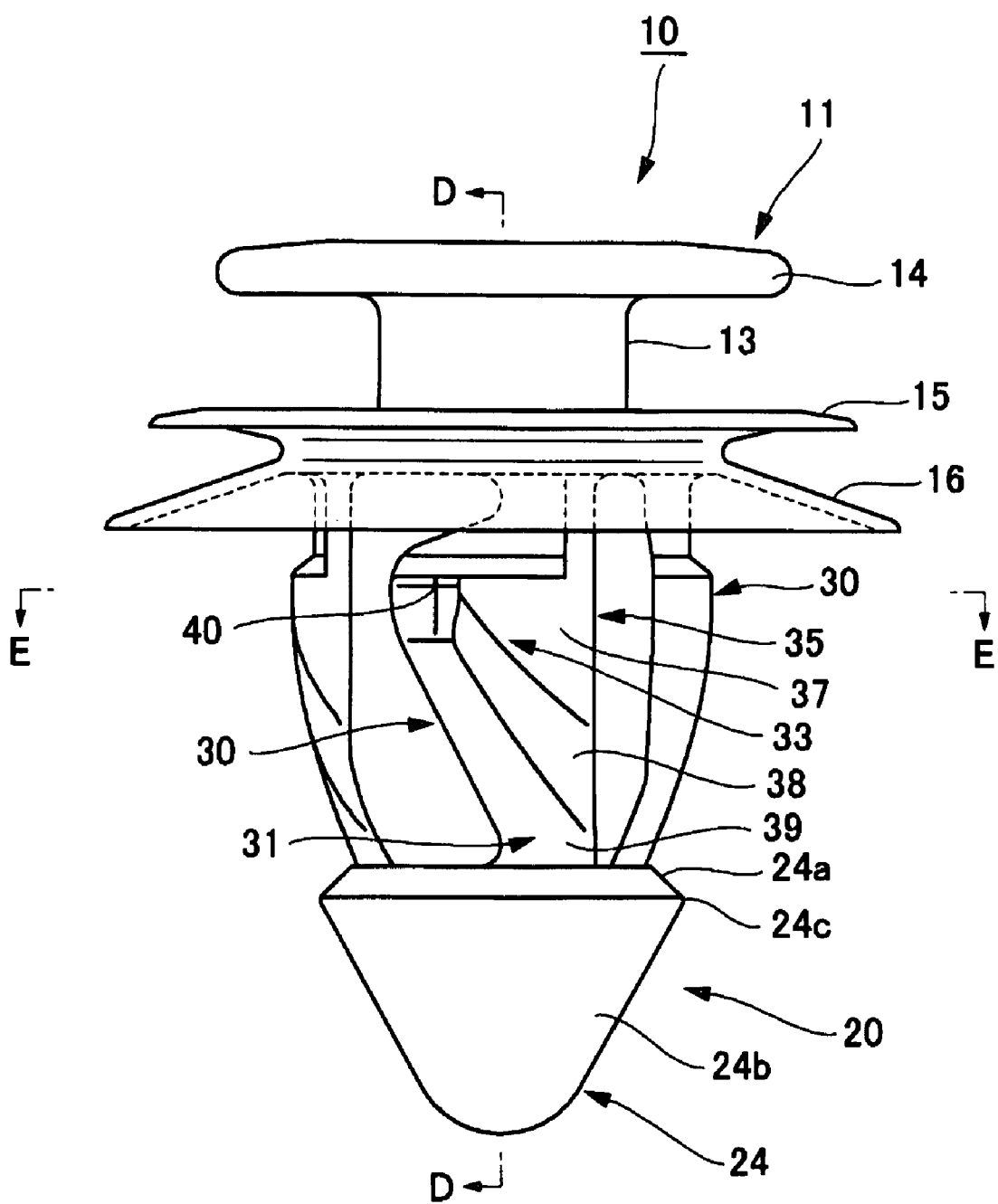
FIG. 12 is a front view of the clip.
Figure 13:
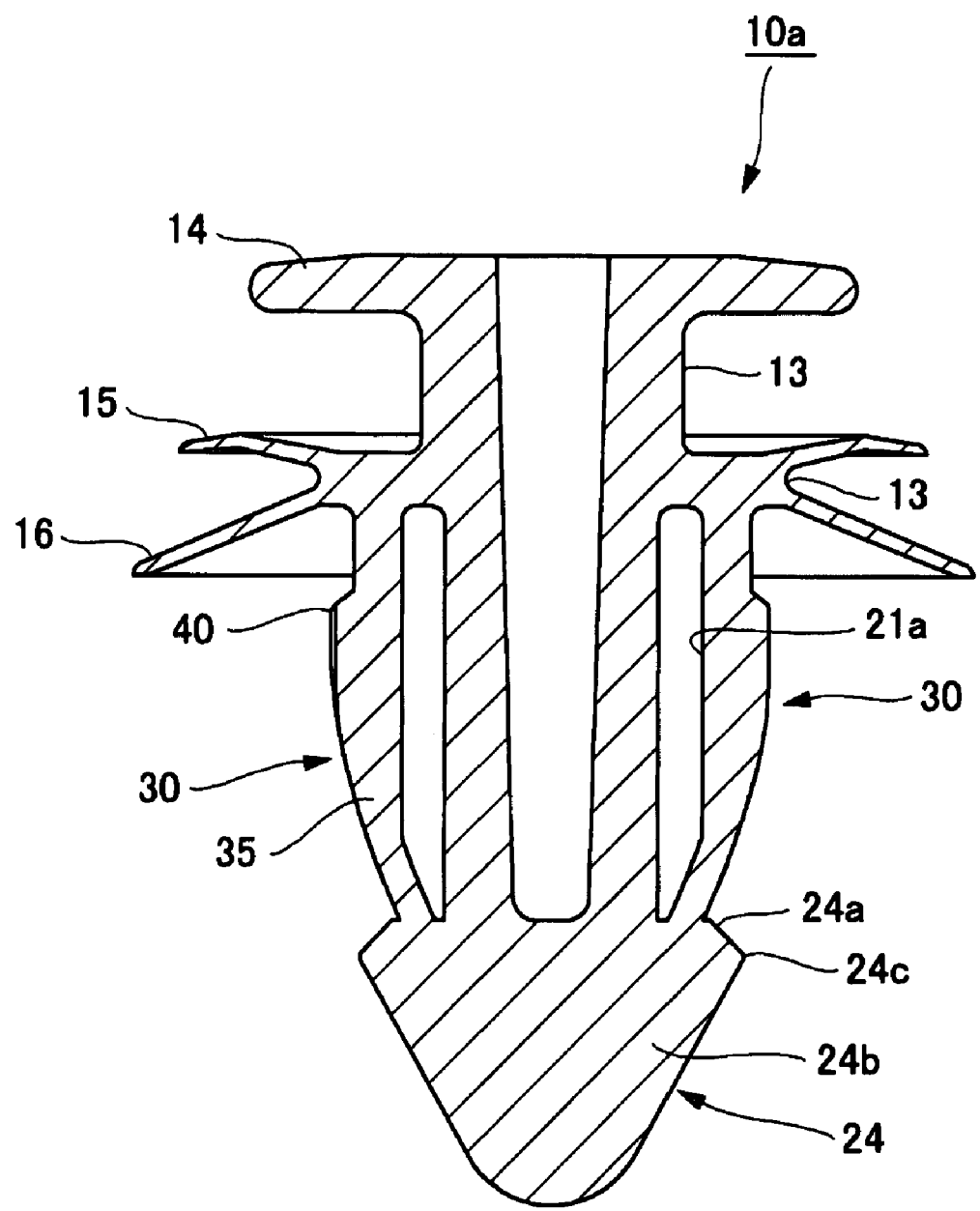
FIG. 13 is a sectional view of the clip taken along the line D-D in FIG. 12.
Figure 14:
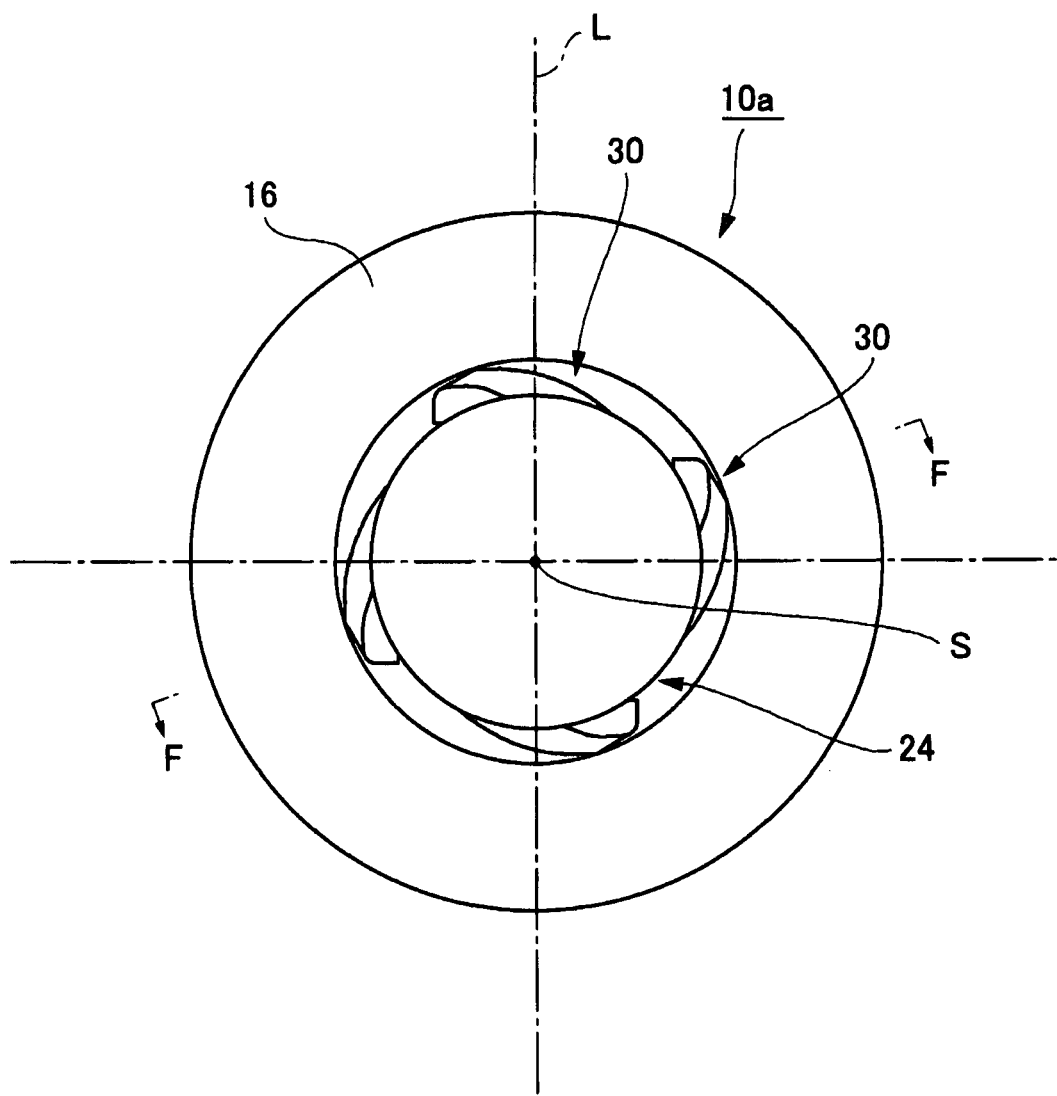
FIG. 14 is a bottom view of the clip.
Figure 15:
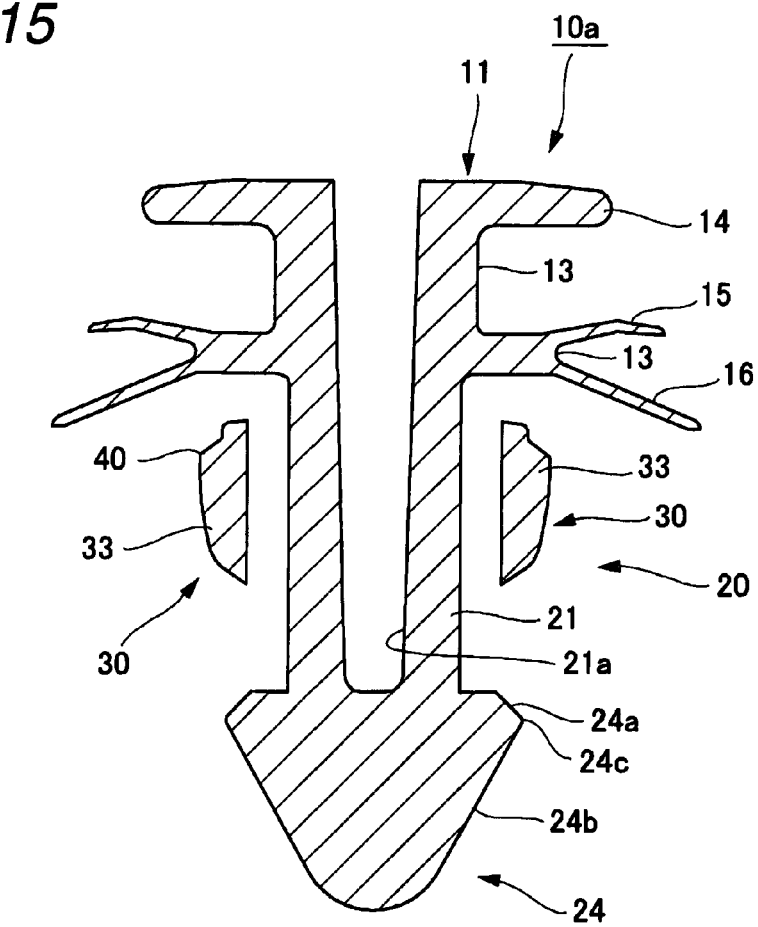
FIG. 15 is a sectional view of the clip taken along the line F-F in FIG. 14.
Figure 16:
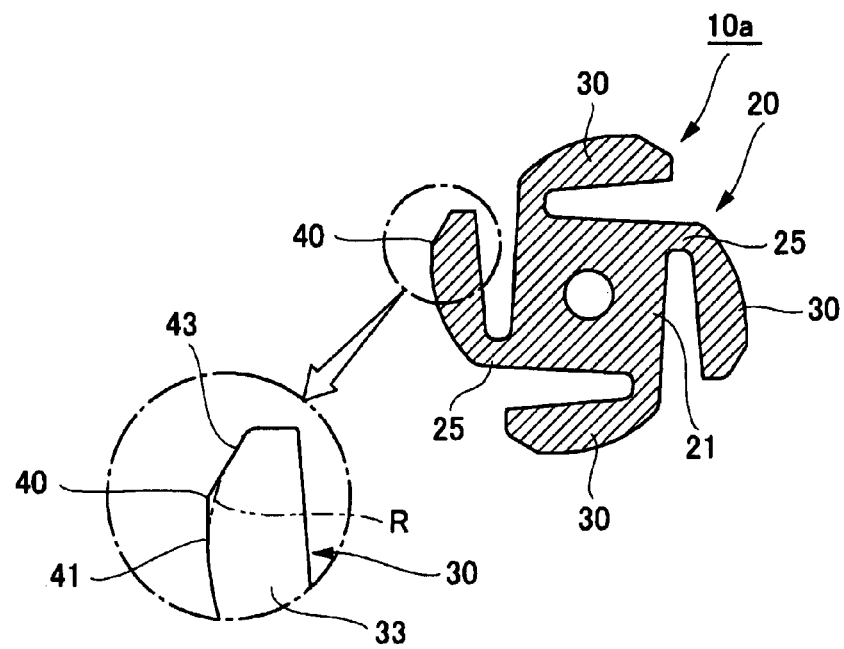
FIG. 16 is a sectional view of the clip taken along the line F-F in FIG. 12.

FIG. 16 shows a cross-sectional view of the clip 10a taken along the line E-E in FIG. 12. An imaginary line R in an enlarged view in FIG. 16 represents the external shape of the clip of the previous embodiment. In this embodiment, the arc-shaped portion 41 is extended further so as to form a projection 40 having an angular cross section between the arc-shaped portion 41 and the inclined portion 43. In this way, the projection 40 constitutes a portion which project highest along the circumferential direction of the deformable portion 33 of the elastic engagement piece 30. In addition, as shown in FIG. 15, also when the deformable portion 33 of the elastic engagement piece 30 is viewed in an axial direction thereof, the projection 40 constitutes portion which projects highest. Consequently, the projection 40 constitutes a portion of the swelling portion 37 which projects highest (a portion which projects most in a shifted-radial direction).

As compared with the clip 10 of the previous embodiment, the clip 10a of this embodiment differs with respect to shape of a tip portion of a leg part 20. A tip portion 24 of this embodiment is shaped so that an outer circumference of a distal area 24b has a taper shape (which is the same as that of the previous embodiment) in which the outer circumference is gradually reduced in diameter towards an inserting direction of the leg part 20 into the mounting hole 3 and an outer circumference of a proximal area 24a thereof has an inverted taper shape in which the outer circumference is gradually reduced in diameter towards an opposite direction to the inserting direction, and a portion between both the taper shapes constitutes a diameter-enlarged portion 24c which has a largest outside diameter in the tip portion 24. This diameter-enlarged portion 24c is made larger in diameter than an outside diameter of a lower end portion of the elastic engagement piece 30.

Figure 10:
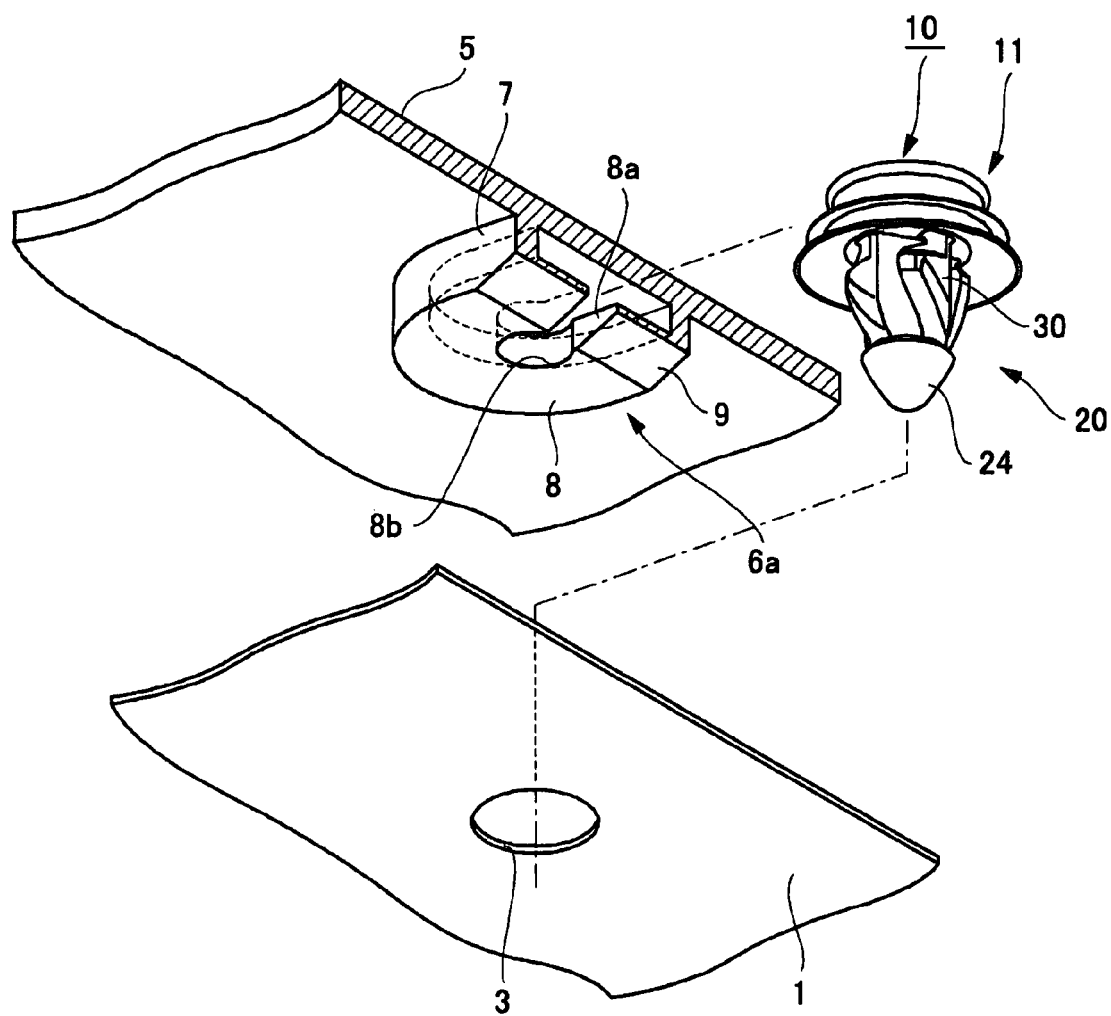
FIG. 10 is a perspective view showing a clip according to another embodiment of the invention.
Figure 11:
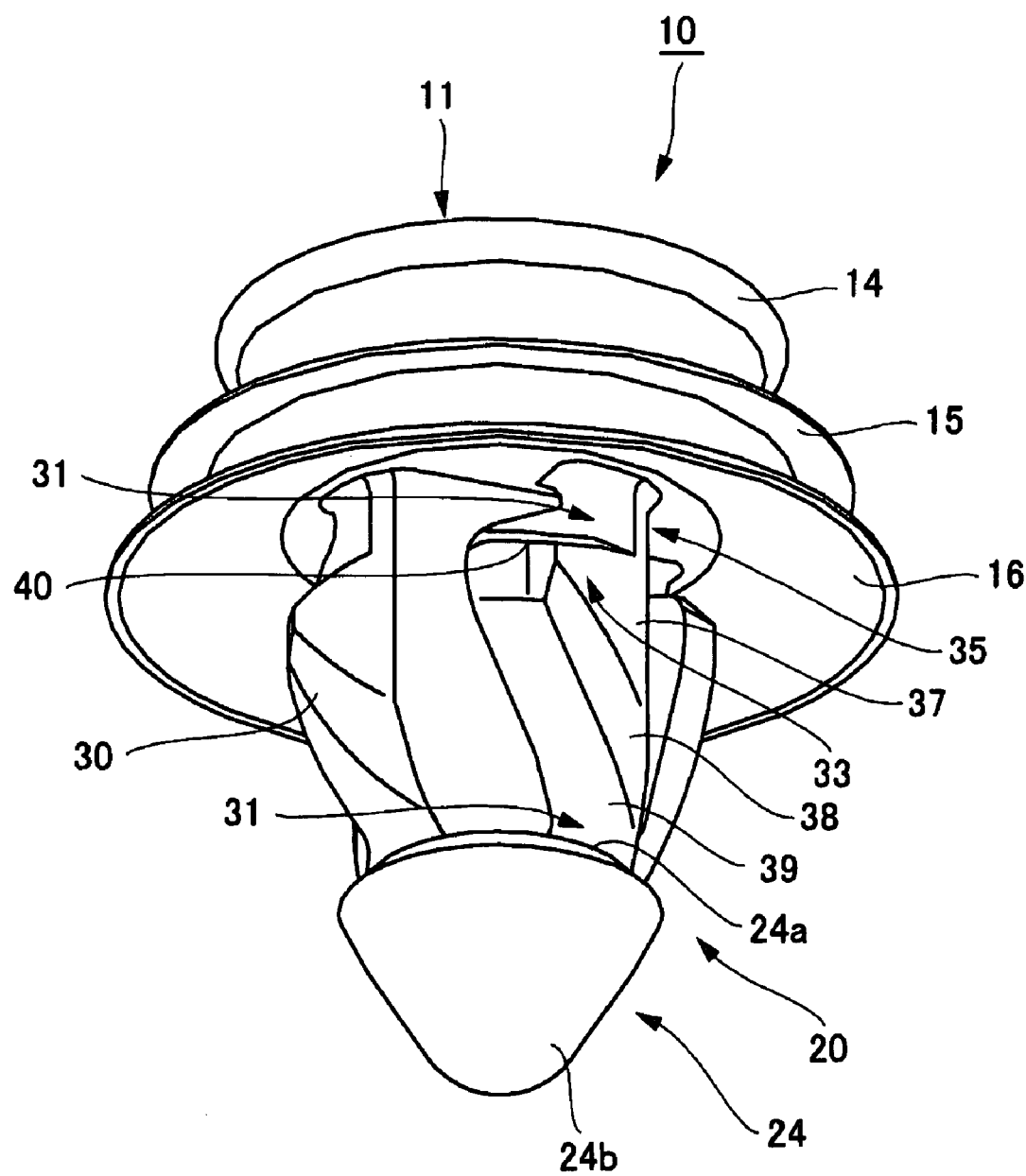
FIG. 11 is an enlarged perspective view of the clip.

Next, how to use the clip 10a which is configured as has been described heretofore will be described. As with the previous embodiment, firstly, by assembling the head part 11 on to a mounting seat 6a as shown in FIG. 10, the clip 10a is attached to the trim board 5. The shape of the mounting seat 6a is slightly different, compared with the mounting seat 6 of the previous embodiment. Namely, a diameter-enlarged hole 8b is formed in a center of a bottom wall 8, and the diameter-enlarged hole 8b is made to communicate with an inserting groove 8a and is given a larger inside diameter than an outside diameter of a neck portion 13. A taper plane 9 is formed on a lower surface of the mounting seat 6a on its front opening side so that the height of the taper plane 9 is gradually reduced towards a distal end of the opening.

The tip portion 24 of the clip 10a is inserted into the mounting hole 3 in the body panel 1 in such a state that the clip 10a is mounted on the mounting seat 6a in the way described above. When the tip portion 24 is inserted in an eccentric state in which the center of the mounting hole 3 is not aligned with an axial center of the clip 10a, the distal area 24b of the clip 10a may be brought into sliding contact with the inner circumference of the mounting hole 3. However, the tip portion 24 is guided by the distal area 24b having the taper-shaped outer circumference so as to be forced into the mounting hole 3 while being centered so that the axial center S coincides with the center X of the mounting hole 3 (refer to FIG. 18A).

Figure 18A:
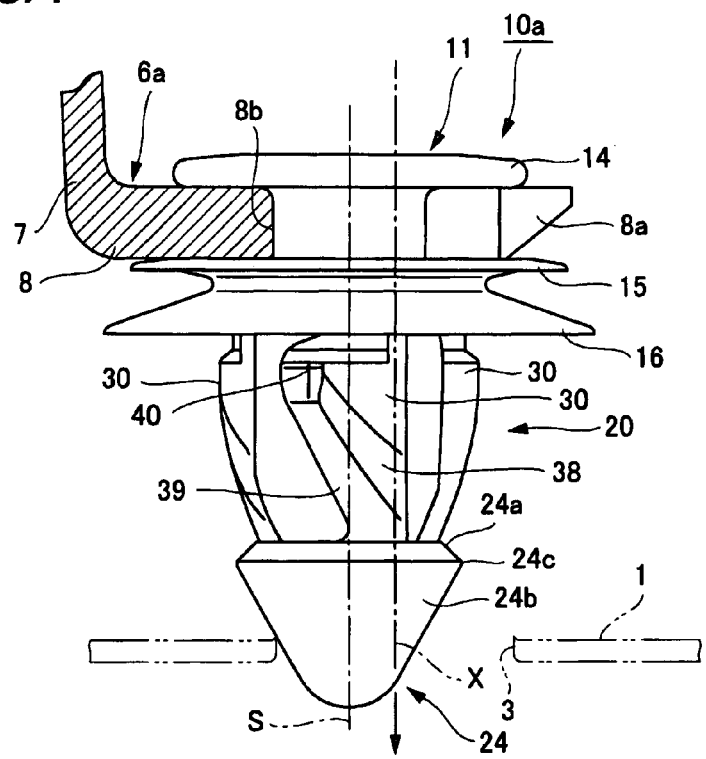
FIG. 18A is an explanatory view showing a state in which a distal end of the clip is being inserted into the mounting hole.
Figure 18B:
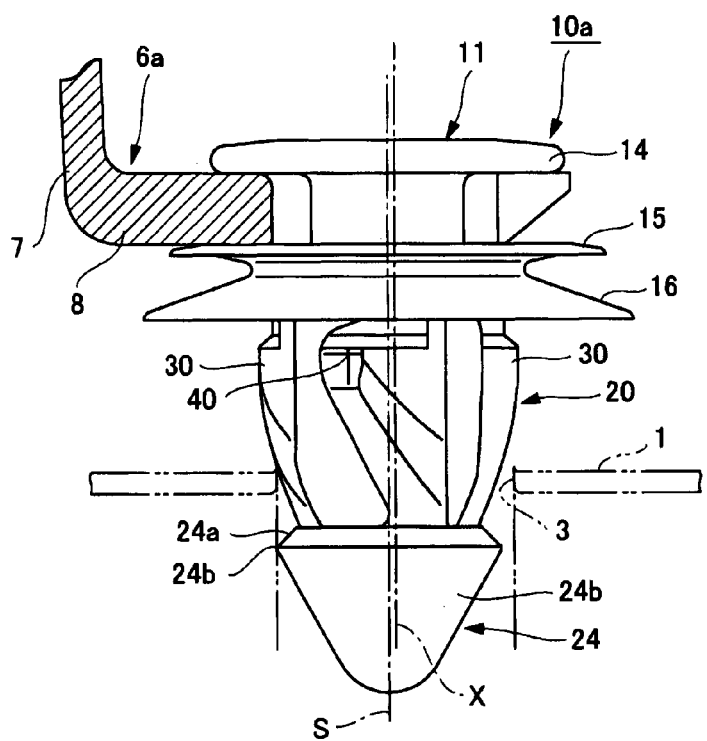
FIG. 18B is an explanatory view showing a state in which the tip portion of the clip has passed through to the back side of the mounting hole.

Then, when the diameter-enlarged portion 24c of the tip portion 24 has ridden in and passed through the mounting hole 3, as shown in FIG. 18B, diameter-reduced lower end portions of the elastic engagement pieces 30 pass through the mounting hole 3, and portions on the outer circumferential surfaces of the elastic engagement pieces 30 which lie closer to upper end portions thereof are then brought into abutment with a circumferential edge of the mounting hole 3. Because of this, for example, even though a flash remains on the inner circumference of the mounting hole 3, the lower end portions or the vicinity thereof of the elastic engagement pieces 30 are protected, and any damage thereto or chipping therein can be prevented, whereby the deformation force and elastic restoring force of the elastic engagement pieces 30 can be maintained and the fixing force thereof to the mounting hole 3 can be held.

When the leg part 20 continues to be forced further into the mounting hole 3 after the outer circumferential surfaces of the elastic engagement pieces 30 have been brought into abutment with the mounting hole 3 as has been described above, second and first taper planes 39, 38 are brought into abutment with the inner circumference of the mounting hole 3, whereupon the elastic engagement pieces 30 are pressed there against to thereby start deformation. Then, as shown in FIG. 17A, when the projections 40 reach the inner circumference of the mounting hole 3 to thereby be brought into abutment with the inner circumference of the mounting hole 3, the projections 40 are pressed against the inner circumference of the mounting hole 3, whereby the elastic engagement pieces 30 are passed therethrough while deforming largely inwards.

As this occurs, in this embodiment, by providing the projections 40 on the swelling portions 37, outer circumferences of the swelling portions 37 are not brought into abutment with the inner circumference of the mounting hole 3 over the wide contact area as has occurred in the previous embodiment (refer to FIG. 8A), but as shown in FIG. 17A, the projections 40 provided on the outer circumferences of the swelling portions 37 pass through the mounting hole 3 while being brought into abutment with the inner circumference of the mounting hole 3 at a relatively narrow contact area. Therefore, the leg part 20 can be forced into the mounting hole 3 relatively smoothly without increasing so much the inserting effort of the leg part 20. Furthermore, since the projection 40 lies at the boundary portion between the arc-shaped portion 41 and the inclined portion 43 on the swelling portion 37 and resides on the line extended from the arc-shaped portion, the deformable amount of the elastic engagement piece 30 is made substantially equal to that of the previous embodiment in which no projection 40 is provided, and hence, an increase in deformable amount of the elastic engagement piece 30 can be suppressed to a least level, and the inserting effort of the leg part 20 into the mounting hole 3 can be suppressed to a relatively low level. In addition, a clicking feeling can be obtained by the projection 40 of a lowest height.

Figure 19:
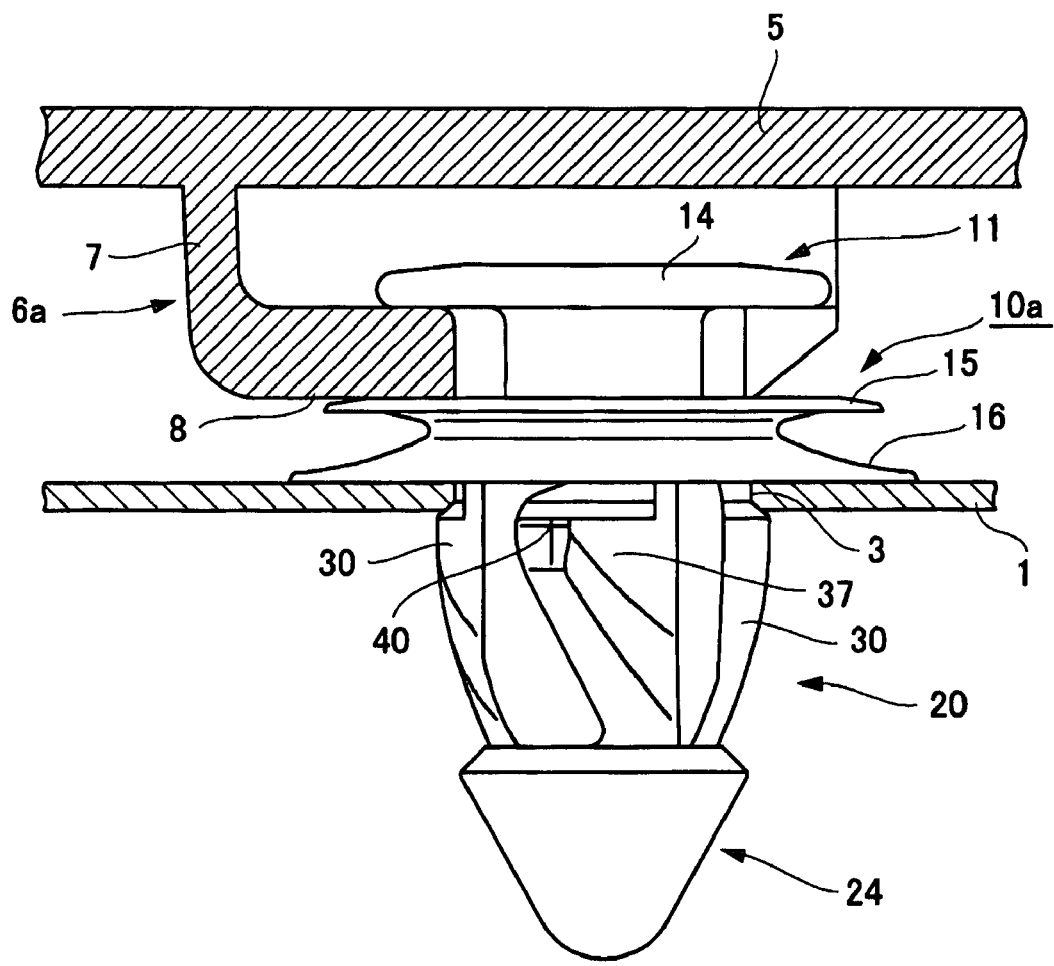
FIG. 19 is an explanatory view showing a state in which a part to be mounted on another part is mounted on another part using the clip.

When the elastic engagement pieces 30 have passed through the mounting hole 3 while deforming inwards and the swelling portions 37 have passed through to the back side of the mounting hole 3, the elastic engagement pieces 30 elastically restore their original positions, and the portions of the swelling portions 37 which are centered at the projections 40 in FIG. 18B are also brought into engagement with the circumferential edge of the back side of the mounting hole 3, whereby the trim board 5 can be fixed to the body panel 1 via the clip 10*a* (refer to FIG. 19). In the clip 10*a* of this embodiment, by providing the projections 40 on the swelling portions 37, the engaging margin for engagement with the mounting hole 3 can be increased more, whereby the clip can strongly be fixed in the mounting hole 3.

An inserting resistance produced when the leg part 20 is inserted into the mounting hole 3 is made to continue to increase until the projections 40 are inserted and are passed through the mounting hole 3 and to reduce quickly when the projections 40 have passed through the mounting hole 3. Since a large rise and fall are provided in inserting resistance, a clicking feeling produced when the projections 40 have passed through the mounting hole 3 can clearly be sensed, whereby whether or not the clip has been fixed in the mounting hole 3 can easily be verified.

Since the outer circumference of the proximal area 24*a* of the tip portion 24 is made to have the inverted taper shape in which the outer circumference is gradually reduced in diameter towards the opposite direction to the inserting direction, when attempting to remove the clip that has been fixed in the mounting hole 3 for some reason, the leg part 20 can smoothly be pulled out of the mounting hole 3 by preventing the tip portion 24 from being caught on the circumferential edge of the back side of the mounting hole 3, whereby the clip 10*a* can easily be removed from the mounting hole 3.

EXAMPLES

The inserting resistances against and holding forces to the mounting hole 3 of the clip 10 of the embodiment illustrated in FIGS. 1 to 9 and the clip 10*a* of the embodiment illustrated in FIGS. 10 to 19 are verified.

Example 1

As Example 1, the clip 10 illustrated in FIGS. 1 to 9 is prepared.

Example 2

As Example 2, the clip 10*a* illustrated in FIGS. 10 to 19 is prepared.
(Inserting Resistance Verification Test)

Figure 20A:
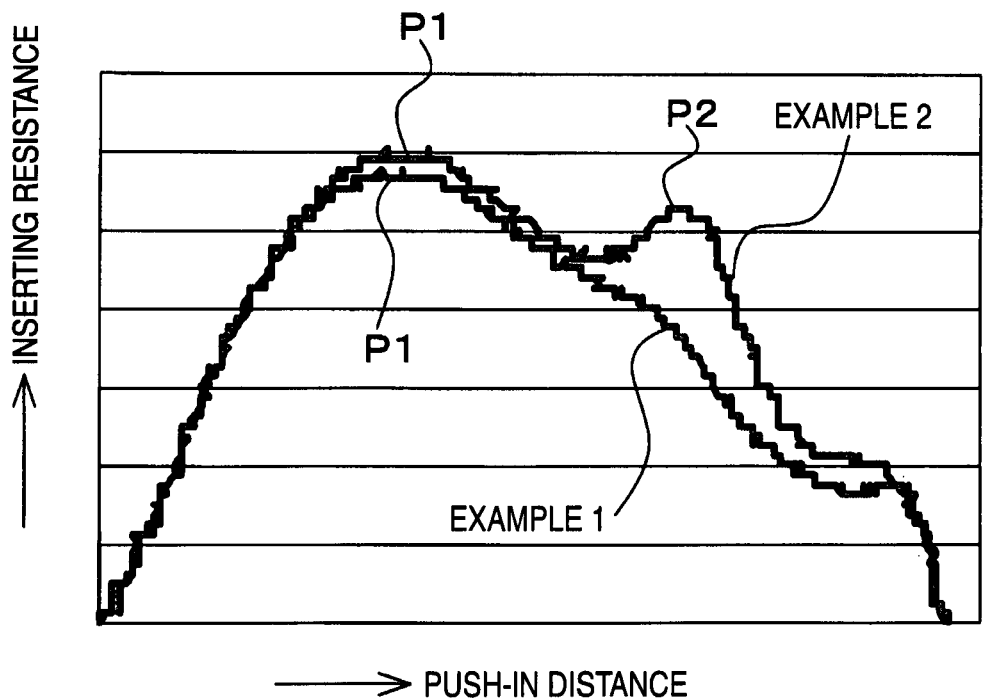
FIGS. 20A and 20B is Graphs showing results of inserting resistance verification tests and holding force verification tests of the clips of the invention.

The respective clips of Example 1 and Example 2 are forced into the mounting hole 3 from the tip portion 23 side at a given pushing speed and step by step by a given distance. Relationships between push distance and inserting resistance of the respective clips are shown in FIG. 20A. The graph indicates that, where the peak inserting resistance (a maximum value) has exceeded, the swelling portions 37 has gradually passed through to the back side of the mounting hole 3.
(Holding Force Verification Test)

Figure 20B:
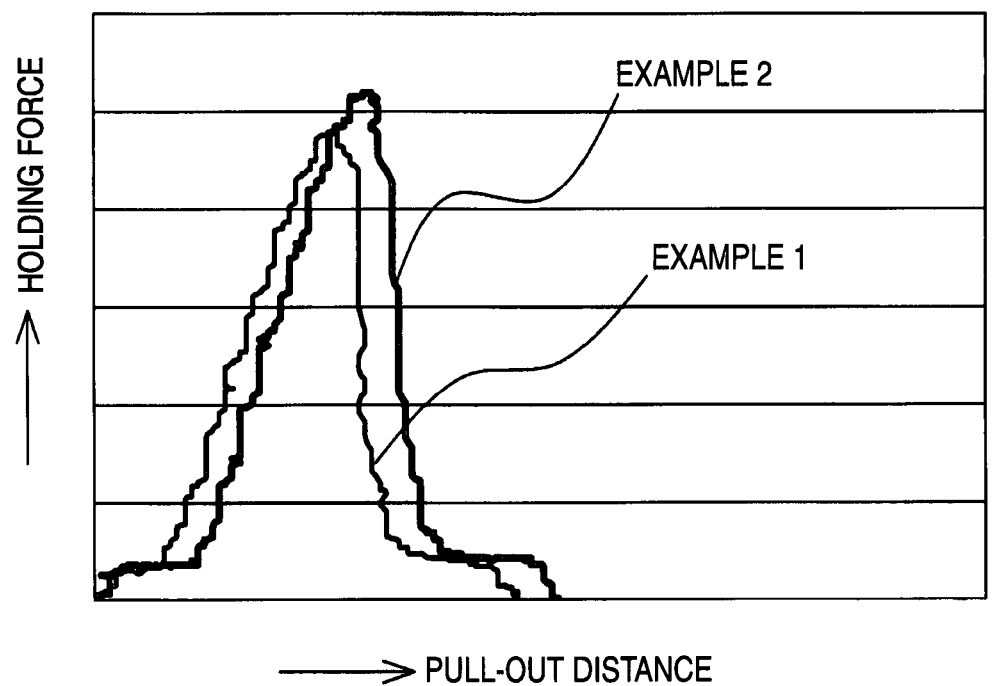

The respective clips of Example 1 and Example 2 are fixed in the mounting hole 3, and the clips are pulled out step by step by a given distance at a given pull-out speed by gripping on the head part 11 in that state. Relationships between pull-out distance and holding force of the clips are shown in FIG. 20B. The graph indicates that the swelling portions 37 gradually passed through to the back side of the mounting hole 3 from a point where the inserting resistance exceeded its peak (a maximum value).
(Results of the Inserting Resistance Verification Test)

As shown in FIG. 20A, in Example 1 having no projection 40, the inserting resistance decreased relatively moderately after the inserting resistance increased to pass through a first peak P1. In Example 2 having the projections 40, the inserting resistance increased to a first peak P1 and then started to decrease after the first peak P1 is passed through, and thereafter, the inserting resistance quickly increased to reach a second peak P2 and then decreased quickly after the second peak P2 is passed through. This second peak P2 can be understood as having been produced when the projections 40 passed through the mounting hole 3. Since an extremely large rise and fall in inserting resistance are provided, a clear clicking feeling can be produced in Example 2. Irrespective of provisions of the projections 40, there is almost no difference in the first peaks between Example 2 and Example 1. That is, in Example 2, the inserting force can be suppressed to as low a level as that of Example 1.
(Results of the Holding Force Verification Test)

As shown in FIG. 20B, compared with a peak position of Example 1, a peak position of Example 2 in which the projections 40 are provided is offset rightwards in the graph, and it is found from this that the clip can not be pulled out unless a longer pull-out distance than that of Example 1 are provided and that the peak value itself is higher than that of Example 1. The clip of Example 2 can be fixed more firmly to the mounting hole 3 than the clip of Example 1.

According to an aspect of the present invention, there is provided a clip that is inserted into the mounting hole with the small inserting force, that is strongly fixed to the mounting hole and that is securely held at a given position.

What is claimed is:
1. A clip comprising:
a flange that is to be brought into abutment with a member having an mounting hole from a front side; and
a leg that is provided on one side of the flange to be inserted into the mounting hole, wherein the leg includes:
  a pillar portion that vertically extends from a center portion of the flange at the one side;
  a tip portion that is provided at a distal end in an axial direction of the pillar portion;
  a rib that outwardly extends from the pillar portion in a section perpendicular to the axial direction of the pillar portion, the rib being connected to the flange and the tip portion at ends thereof in the axial direction; and
  an elastic engagement piece that extends from a protruding end of the rib in a circumferential direction of the pillar portion in the section such that the elastic engagement piece continuously extends from the rib and such that the elastic engagement piece is movable toward and away from the pillar portion wherein the elastic engagement piece is to be engaged with the mounting hole from a rear side, and
wherein the elastic engagement piece includes:
  a rigid portion that is connected to the rib and that is connected to the flange and the tip portion, wherein the rigid portion extends along the axial direction of the pillar portion such that the rigid portion is directly connected to the flange at one end thereof; and
  a deformable portion that extends from the rigid portion and that is disconnected from the flange and the tip portion,
wherein the deformable portion has a swelling portion that outwardly protrudes more than an inner circumference of the mounting hole,
wherein the deformable portion includes an inner surface side facing the pillar portion and an outer surface side opposite to the inner surface side, and
wherein the deformable portion includes the swelling portion on the outer surface side wherein the swelling portion is formed by increasing a thickness of the deformable portion in the section such that the swelling portion protrudes outwardly.

2. The clip of claim 1,
wherein the swelling portion has a projection that is formed to be highest along the circumferential direction in the deformable portion and to be highest along the axial direction in the deformable portion.

3. The clip of claim 2,
wherein the swelling portion includes:
  an arc portion that extends in the circumferential direction from the distal end of the rib; and
  an inclined portion that extends in the circumferential direction from a distal end of the arc portion,
wherein the projection is placed in a boundary of the arc portion and the inclined portion, and
wherein, as viewed from the axial direction when the leg is inserted in the mounting hole so that the elastic engagement piece is inwardly deformed, the arc portion follows the inner circumferential of the mounting hole, the inclined portion extends to gradually separate from the inner circumference of the mounting hole, and the projection abuts the inner circumference of the mounting hole.

4. The clip of claim 1,
wherein the rigid portion includes a second swelling portion that is continuous with the swelling portion on the deformable portion and that protrudes more than the inner circumference of the mounting hole, and
wherein an outwardly protruding height of the second swelling portion is smaller than that of the swelling portion.

5. The clip of claim 1,
wherein the rib extends so that an extending direction thereof does not pass through a center of the pillar portion.

6. The clip of claim 1,
wherein the elastic engagement piece has cuts formed from a distal end thereof at ends in the axial direction, and
wherein the deformable portion is disconnected from the flange and the tip portion by the cuts.

7. A clip comprising:
a flange that is to be brought into abutment with a member having a mounting hole from a front side; and
a leg that is provided on one side of the flange to be inserted into the mounting hole,
wherein the leg includes:
  a pillar portion that vertically extends from a center portion of the flange at the one side;
  a tip portion that is provided at a distal end in an axial direction of the pillar portion;
  a rib that outwardly extends from the pillar portion in a section perpendicular to the axial direction of the pillar portion, the rib being connected to the flange and the tip portion at ends thereof in the axial direction; and
  an elastic engagement piece that extends from a protruding end of the rib in a circumferential direction of the pillar portion in the section, the elastic engagement piece to be engaged with the mounting hole from a rear side,
wherein the elastic engagement piece includes:
  a rigid portion that is continuous from the rib, ends of the rigid portion in the axial direction being connected to the flange and the tip portion; and
  a deformable portion that is continuous from the rigid portion, ends of the deformable portion in the axial direction being disconnected from the flange and the tip portion,
wherein the deformable portion has a swelling portion that outwardly protrudes more than an inner circumference of the mounting hole,
wherein the deformable portion includes an inner surface side facing the pillar portion and an outer surface side opposite to the inner surface side, and
wherein the deformable portion includes the swelling portion on the outer surface side wherein the swelling portion is formed by increasing a thickness of the deformable portion in the section such that the swelling portion protrudes outwardly, and
wherein both of the rigid portion and the deformable portion are to be engaged with the mounting hole from the rear side.

8. The clip of claim 7,
wherein the deformable portion has a first swelling portion that outwardly protrudes more than an inner circumference of the mounting hole,
wherein the rigid portion includes a second swelling portion that is continuous with the first swelling portion and that protrudes more than the inner circumference of the mounting hole, and
wherein both of the first swelling portion and the second swelling portion are to be engaged with the mounting hole from the rear side.

9. The clip of claim 8,
wherein a pair of cuts are formed in the elastic engagement piece so as to completely remove end portions of the deformable portion in the axial direction and to partially remove end portions of the rigid portion in the axial direction.

10. The clip of claim 9,
wherein the cuts remove radially outer portions of the end portions of the rigid portion.

11. The clip of claim 9,
wherein one of the cuts positioned closer to the flange removes the end portions of the deformable portion and the rigid portion to define upper ends of the first swelling portion and the second swelling portion.

* * * * *